(12) United States Patent
Boivin et al.

(10) Patent No.: US 10,414,448 B2
(45) Date of Patent: Sep. 17, 2019

(54) SUPPORT SYSTEM FOR AERODYNAMIC SKIRT ASSEMBLY AND METHOD OF INSTALLATION THEREOF

(71) Applicant: TRANSTEX COMPOSITE INC., Montreal (CA)

(72) Inventors: Mathieu Boivin, Montreal (CA); Walid Deir, Lachine (CA); Georges Bassily, Laval (CA); Swaroop Mulenahalli Kantharaju, Montreal (CA); Elizabeth Tome, St-Leonard (CA); Sylvain Daoust, Vaudreuil-Dorion (CA); Ali Fellah Jahromi, Saint-Laurent (CA)

(73) Assignee: Transtex LLC, Montreal, Quebec (CA)

( * ) Notice: Subject to any disclaimer, the term of this patent is extended or adjusted under 35 U.S.C. 154(b) by 241 days.

(21) Appl. No.: 15/257,571

(22) Filed: Sep. 6, 2016

(65) Prior Publication Data
US 2017/0066487 A1    Mar. 9, 2017

Related U.S. Application Data

(60) Provisional application No. 62/314,082, filed on Mar. 28, 2016, provisional application No. 62/215,129, filed on Sep. 7, 2015.

(51) Int. Cl.
*B62D 35/00*    (2006.01)

(52) U.S. Cl.
CPC .................. *B62D 35/001* (2013.01)

(58) Field of Classification Search
CPC .................................................. B62D 35/001

USPC ..................................................... 296/180.4
See application file for complete search history.

(56) References Cited

U.S. PATENT DOCUMENTS

| | | |
|---|---|---|
| 1,127,241 A | 2/1915 | Hawksworth |
| 1,511,085 A | 10/1924 | McIntyre |
| 1,846,269 A | 2/1932 | Musselman |
| 2,318,863 A | 5/1943 | Jabelmann |
| 2,546,268 A | 3/1951 | Legris |
| 2,605,119 A | 7/1952 | Earnest |
| 3,711,146 A | 1/1973 | Madzsar |
| 3,775,917 A | 12/1973 | Struben |

(Continued)

FOREIGN PATENT DOCUMENTS

| | | |
|---|---|---|
| DE | DT2537217 A1 | 3/1977 |
| JP | 2002019574 | 1/1985 |
| JP | 60012378 | 1/2002 |

*Primary Examiner* — Joseph D. Pape
(74) *Attorney, Agent, or Firm* — Mathieu Audet

(57) ABSTRACT

Aerodynamic skirt systems are used to reduce air drag of a vehicle. The present aerodynamic skirt system comprises a skirt panel, a plurality of struts, each strut comprising an upper portion for securing an upper portion of the skirt panel to the trailer, a strut member connected, at a first end thereof, to the upper portion of the strut, a lower portion for securing a lower portion of the skirt panel, the lower portion being connected to the strut member at a second end thereof, the strut member including a concave portion adapted to sustain a force applied by air routing on the aerodynamic skirt in an aerodynamic configuration thereof, the strut member being adapted to buckle and bend when a force exceeding a buckling threshold is applied on the aerodynamic skirt to move the aerodynamic skirt in an object avoidance configuration. A kit and a method of use thereof is also presented.

20 Claims, 41 Drawing Sheets

(56) References Cited

U.S. PATENT DOCUMENTS

| | | | |
|---|---|---|---|
| 3,854,769 | A | 12/1974 | Saunders |
| 4,119,339 | A | 10/1978 | Heimburger |
| 4,262,953 | A | 4/1981 | McErlane |
| 4,386,801 | A | 6/1983 | Chapman |
| 4,397,496 | A | 8/1983 | Drygas, III |
| 4,418,853 | A | 12/1983 | Shaffer |
| 4,421,354 | A | 12/1983 | Lemaster |
| 4,486,046 | A | 12/1984 | Whitney |
| 4,511,170 | A | 4/1985 | Sankrithi |
| 4,585,262 | A | 4/1986 | Parks |
| 4,611,847 | A | 9/1986 | Sullivan |
| 4,616,869 | A | 10/1986 | Sacco |
| 4,640,541 | A | 2/1987 | FitzGerald |
| 4,746,160 | A | 5/1988 | Wiesemeyer |
| 5,078,448 | A | 1/1992 | Selzer |
| 5,094,503 | A | 3/1992 | Dare-Bryan |
| 5,280,990 | A | 1/1994 | Rinard |
| 5,358,210 | A | 10/1994 | Simon |
| 5,465,669 | A | 11/1995 | Andrus |
| 5,536,062 | A | 7/1996 | Spears |
| 5,609,384 | A | 3/1997 | Loewen |
| 5,788,321 | A | 8/1998 | McHorse |
| 5,921,617 | A | 7/1999 | Loewen |
| 6,017,013 | A | 1/2000 | Simonian |
| 6,644,720 | B2 | 11/2003 | Long |
| 6,685,256 | B1 | 2/2004 | Shermer |
| 6,742,616 | B2 | 6/2004 | Leban |
| 6,874,842 | B2 | 4/2005 | Hojna |
| 6,932,419 | B1 | 8/2005 | McCullough |
| 6,974,178 | B2 | 12/2005 | Ortega |
| 7,040,682 | B2 | 5/2006 | Tokumoto |
| 7,073,845 | B2 | 7/2006 | Ortega |
| 7,093,889 | B2 | 8/2006 | Graham |
| 7,147,270 | B1 | 12/2006 | Andrus |
| 7,163,258 | B2 | 1/2007 | Dyer, II |
| 7,168,757 | B2 | 1/2007 | Futatsuhashi |
| 7,216,923 | B2 | 5/2007 | Wong |
| 7,404,592 | B2 | 7/2008 | Reiman |
| 7,497,502 | B2 | 3/2009 | Wood |
| 7,578,541 | B2 | 8/2009 | Layfield |
| 7,604,284 | B2 | 10/2009 | Reiman |
| 7,665,795 | B2 | 2/2010 | Shishikura |
| 7,686,385 | B2 | 3/2010 | Dolan |
| 7,740,303 | B2 | 6/2010 | Wood |
| 7,762,615 | B2 | 7/2010 | Dayton |
| 7,780,224 | B2 | 8/2010 | Roush |
| 7,789,453 | B2 | 9/2010 | Roush |
| 8,087,715 | B2 | 1/2012 | Andrus |
| 8,186,745 | B2 | 5/2012 | Graham |
| 8,191,956 | B1 | 6/2012 | Dixon, Jr. |
| 8,210,599 | B2 | 7/2012 | Butler |
| 8,413,937 | B2 * | 4/2013 | Di Franco ............ B62D 35/001 248/201 |
| 2002/0021023 | A1 | 2/2002 | Leban |
| 2003/0057736 | A1 | 3/2003 | Long |
| 2003/0234555 | A1 | 12/2003 | Hojna |
| 2004/0155485 | A1 | 8/2004 | Hamnett |
| 2005/0056117 | A1 | 3/2005 | Jones |
| 2005/0146161 | A1 | 7/2005 | Uland |
| 2005/0161976 | A1 | 7/2005 | Ortega |
| 2006/0103167 | A1 | 5/2006 | Wong |
| 2006/0152038 | A1 | 7/2006 | Graham |
| 2006/0273625 | A1 | 12/2006 | Andrus |
| 2007/0120397 | A1 | 5/2007 | Layfield |
| 2007/0132278 | A1 | 6/2007 | Lester |
| 2007/0176466 | A1 | 8/2007 | Dolan |
| 2007/0257512 | A1 | 11/2007 | Anderson |
| 2008/0061597 | A1 | 3/2008 | Reiman |
| 2008/0061598 | A1 | 3/2008 | Reiman |
| 2008/0093887 | A1 | 4/2008 | Wood |
| 2008/0179916 | A1 | 7/2008 | Breakfield |
| 2008/0238139 | A1 | 10/2008 | Cardolle |
| 2008/0303309 | A1 | 12/2008 | Dayton |
| 2008/0303311 | A1 | 12/2008 | Roush |
| 2009/0146453 | A1 | 6/2009 | Ortega |
| 2009/0160214 | A1 | 6/2009 | Alguera |
| 2009/0195017 | A1 | 8/2009 | Wood |
| 2009/0212595 | A1 | 8/2009 | Heppel |
| 2009/0212596 | A1 | 8/2009 | Reiman |
| 2009/0230726 | A1 | 9/2009 | Reiman |
| 2010/0117396 | A1 | 5/2010 | Dayton |
| 2010/0231000 | A1 | 9/2010 | Andrus |
| 2010/0264691 | A1 | 10/2010 | Giromini |
| 2011/0204677 | A1 | 8/2011 | Wood |
| 2011/0233960 | A1 | 9/2011 | Heinz |
| 2011/0285167 | A1 | 11/2011 | Butler |
| 2012/0032475 | A1 | 2/2012 | Grandominico |
| 2012/0074728 | A1 | 3/2012 | Senatro |
| 2012/0091754 | A1 | 4/2012 | Lee |
| 2012/0200113 | A1 | 8/2012 | Brown |
| 2013/0001980 | A1 | 1/2013 | Boivin |
| 2014/0300134 | A1 * | 10/2014 | Gerst ................... B62D 35/001 296/180.4 |
| 2014/0353443 | A1 * | 12/2014 | Kuo ..................... B62D 35/001 248/201 |
| 2015/0259014 | A1 * | 9/2015 | Baker ................. B62D 35/001 296/180.4 |
| 2016/0096558 | A1 * | 4/2016 | Bassily ................ B62D 35/001 296/180.4 |

\* cited by examiner (SECTION OF PLANE OF FIG. 33)

SUPPORT SYSTEM FOR AERODYNAMIC SKIRT ASSEMBLY AND METHOD OF INSTALLATION THEREOF

CROSS-REFERENCE

The present application relates to and is a non-provisional application claiming priority under 35 U.S.C. § 119(e) from U.S. Provisional Patent Application No. 62/215,129, filed Sep. 7, 2015 under 35 U.S.C. § 111, entitled SUPPORT SYSTEM FOR AERODYNAMIC SKIRT ASSEMBLY AND METHOD OF INSTALLATION THEREOF and also relates to and is a non-provisional application claiming priority under 35 U.S.C. § 119(e) from U.S. Provisional Patent Application No. 62/314,082, filed Mar. 28, 2016 under 35 U.S.C. § 111, entitled SELF-REPOSITIONING STRUT PORTION FOR AERODYNAMIC SKIRT, which are both incorporated herein by reference in its entirety.

FIELD OF THE INVENTION

This invention generally relates to a strut for aerodynamic skirt. More precisely, the invention relates to a self-repositioning strut for securing an aerodynamic skirt to a vehicle to improve the aerodynamic efficiency of the vehicle.

BACKGROUND OF THE INVENTION

Road tractors are used to pull semi-trailers on roads to transport cargo. Aerodynamic apparatuses are installed on the road tractor and/or on the semi-trailer in order to reduce the aerodynamic air drag and improve fuel efficiency.

Trailer skirts made of rigid materials are installed on both lateral sides of a road trailer to help manage the flow of air around and underneath the trailer. Brackets, also made of rigid material, are affixed to the trailer to secure the skirts positioned thereto. These aerodynamic skirts are secured to the bottom portion of the trailer, or to the sides of the trailer's floor, to ensure proper positioning when the vehicle is moving.

People who are familiar with the trucking industry know that trailers are built in various configurations. Frame assembly of trailer can use members and beams of different dimensions. For example, an I-beam, that is commonly used in trailer manufacturing, also known as H-beam, W-beam (for "wide flange"), Universal Beam (UB), Rolled Steel Joist (RSJ), or double-T, is a beam with an I or H-shaped cross-section. The horizontal elements of the "I" are known as flanges, while the vertical element is termed the "web". I-beams are usually made of structural steel, or aluminum, and are used in construction and civil engineering. The web resists shear forces, while the flanges resist most of the bending moment experienced by the beam. Beam theory shows that the I-shaped section is a very efficient form for carrying both bending and shear loads in the plane of the web. An adaptable securing mechanism is hence desirable to adapt to a range of I-beam dimensions.

The skirts, because of their position under the trailer's floor and their proximity with the road, are significantly vulnerable and might easily enter in contact with surrounding obstacles. Portions of the securing mechanism holding the skirts, when put under significant stress, plastically bend and/or break to effect the skirts' position in respect to the road trailer thus reducing the efficiency of the skirts. Additionally, the assembly can be crooked or not precisely aligned, which is causing additional challenges to secure the aerodynamic skirt assembly to the vehicle.

Aerodynamic skirt assemblies in the art are complex to install given the many adjustments required to match the precise configuration of each trailer. The number of parts required to secure the strut to the trailer is generally significant and time consuming to assemble. Also, the weight of the skirt assembly is important to prevent unduly adding weight to the trailer and hence increase its fuel consumption.

Skirt supporting struts in the art have a linear deflection rate that is proportional to the force applied thereto. The struts need to be rigid enough to remain in their operating position and channel efficiently air around the trailer. This required rigidity is significant and is detrimental to proper flexing of the skirt assembly when contacting a foreign object.

Therefore, there exists a need in the art for an improved aerodynamic skirt assembly over the existing art. There is a need in the art for an improved skirt-securing strut adapted to recover its original shape after contacting a foreign object. There is also a need for a skirt-securing strut that can flex, can be economically manufactured and easily installed.

SUMMARY OF THE INVENTION

It is one aspect of the present invention to alleviate one or more of the drawbacks of the background art by addressing one or more of the existing needs in the art.

Accordingly, embodiments of this invention provide an improved trailer aerodynamic skirt assembly over the prior art.

An aspect of one or more embodiments of the invention provides a shock-resistant skirt assembly adapted to be installed on a semi-trailer to reduce the aerodynamic drag produced by the movement of the trailer when pulled by a tractor.

An aspect of one or more embodiments of the invention provides a concave strut for an aerodynamic skirt support mechanism to resiliently secure an aerodynamic skirt panel on a trailer.

An aspect of one or more embodiments of the invention provides a self-repositioning strut that is adapted to bend when it contacts a foreign object and recovers its original position and shape thereafter.

An aspect of one or more embodiments of the invention provides a strut adapted to bend/flex with significant displacement without breaking, when the skirt assembly contacts a foreign object, and that is self-recovering its original position and shape thereafter.

An aspect of one or more embodiments of the invention provides a one-part integrated strut fixedly securing an upper portion and resiliently securing a lower portion of a skirt panel.

An aspect of one or more embodiments of the invention provides a strut portion having a height sized and designed to flex when the skirt assembly contacts a foreign object and returns to equilibrium upon removal of the contact with the foreign object.

An aspect of one or more embodiments of the invention provides a strut including a flex portion adapted to keep an aerodynamic configuration when under a predetermined mechanical load and adapted to buckle in an object avoidance configuration when a load exceeding the predetermined mechanical load is applied thereto.

An aspect of one or more embodiments of the invention provides a strut including a flex portion with a concave portion.

An aspect of one or more embodiments of the invention provides a strut portion including a semi-circular shape having a concave side facing the skirt panel.

An aspect of one or more embodiments of the invention provides a strut portion including a semi-circular shape having a convex side facing the skirt panel.

An aspect of one or more embodiments of the invention provides a strut portion including openings therein for receiving therein a connector portion therethrough for securing the strut portion to a trailer.

An aspect of one or more embodiments of the invention provides a strut portion including a stabilizer for transferring mechanical loads to a trailer when the strut sustains a mechanical load.

An aspect of one or more embodiments of the invention provides a strut portion including alignment guides for locating the strut portion to a trailer.

An aspect of one or more embodiments of the invention provides a strut for securing an aerodynamic skirt panel to a trailer, the strut comprising an upper portion for securing an upper portion of the aerodynamic skirt to the trailer, a strut member connected, at a first end thereof, to the upper portion of the strut, a lower portion for securing a lower portion of the aerodynamic skirt, the lower portion being connected to the strut member at a second end thereof, the strut member including a concave portion adapted to sustain a force applied by air routing on the aerodynamic skirt in an aerodynamic configuration thereof, the strut member being adapted to buckle and bend when a force exceeding a buckling threshold is applied on the aerodynamic skirt to move the aerodynamic skirt in an object avoidance configuration.

An aspect of one or more embodiments of the invention provides an aerodynamic skirt system comprising a skirt panel, a plurality of struts, each strut comprising an upper portion for securing an upper portion of the skirt panel to the trailer, a strut member connected, at a first end thereof, to the upper portion of the strut, a lower portion for securing a lower portion of the skirt panel, the lower portion being connected to the strut member at a second end thereof, the strut member including a concave portion adapted to sustain a force applied by air routing on the aerodynamic skirt in an aerodynamic configuration thereof, the strut member being adapted to buckle and bend when a force exceeding a buckling threshold is applied on the aerodynamic skirt to move the aerodynamic skirt in an object avoidance configuration.

Accordingly, embodiments of this invention provide an improved resilient trailer aerodynamic skirt assembly over the prior art.

Other embodiments and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which form a part of this original disclosure.

DETAILED DESCRIPTION OF PREFERRED EMBODIMENTS

Figure 1:
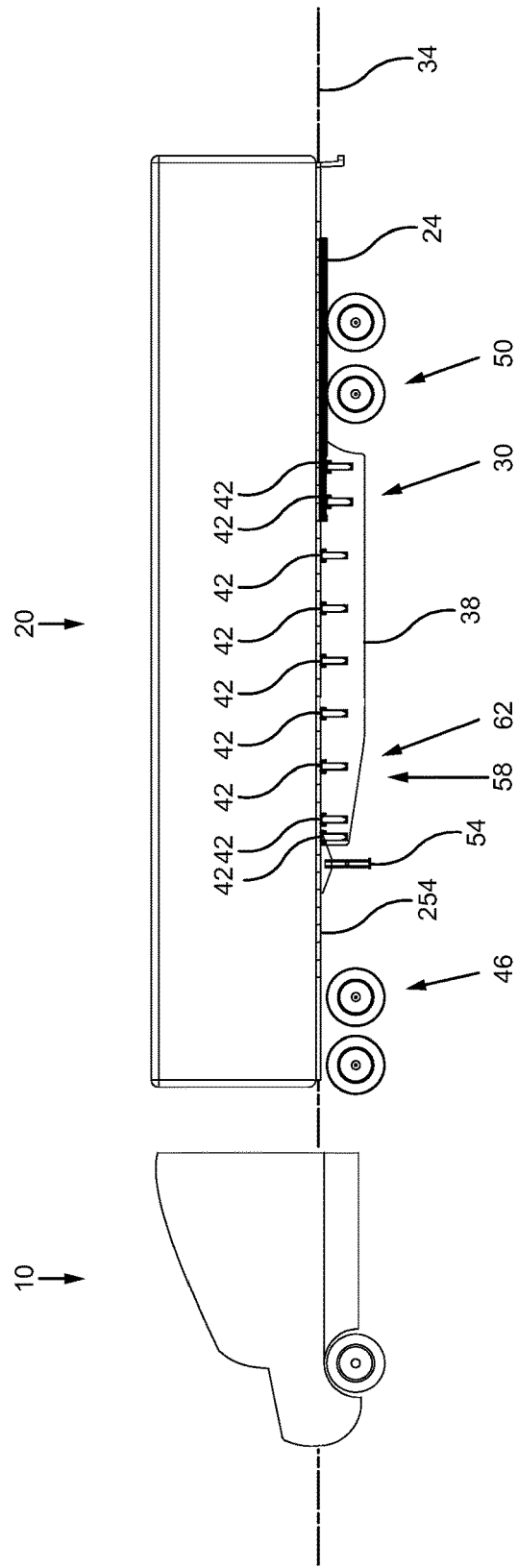
FIG. 1 is a side elevation view of a vehicle with a trailer in accordance with at least one embodiment of the invention.
Figure 2:
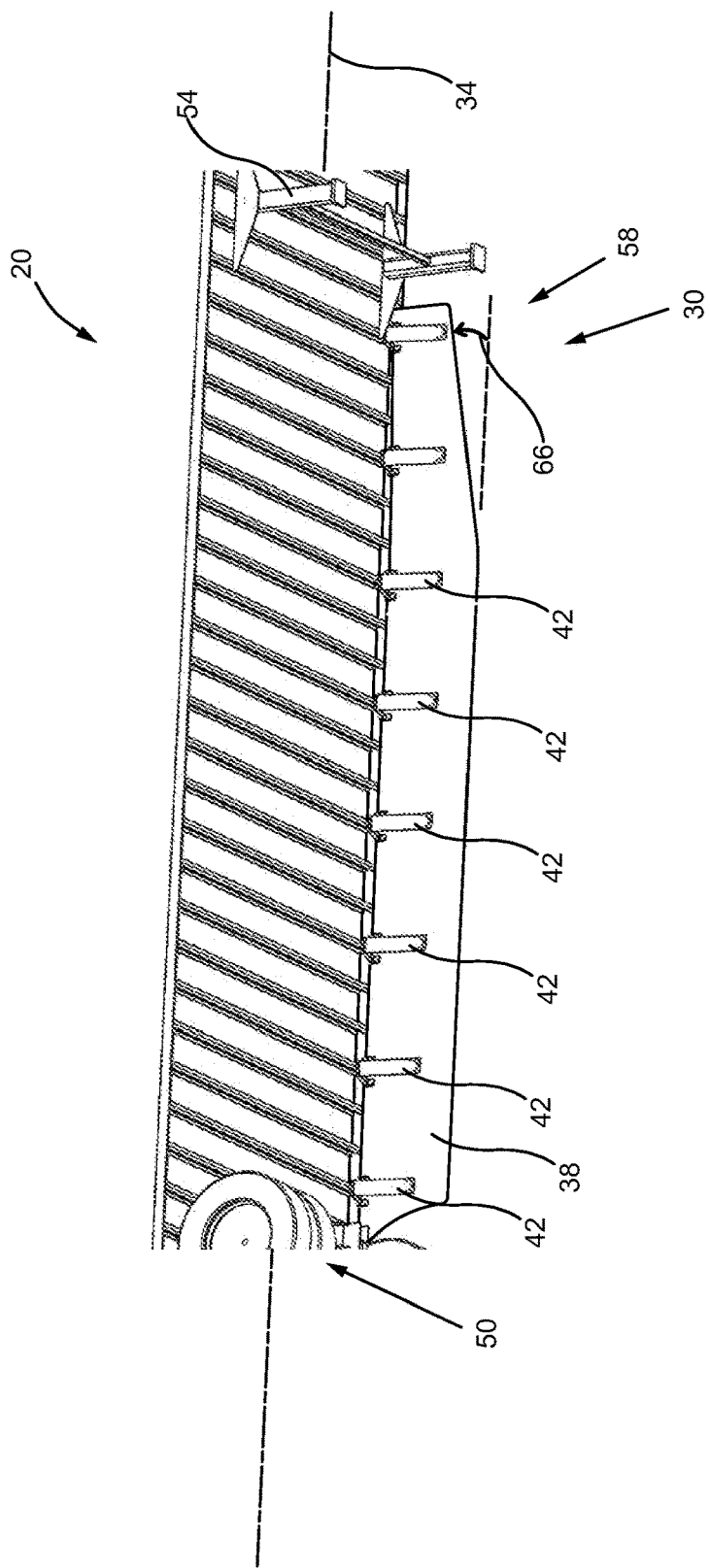
FIG. 2 is a side elevation view of a portion of a trailer in accordance with at least one embodiment of the invention.
Figure 3:
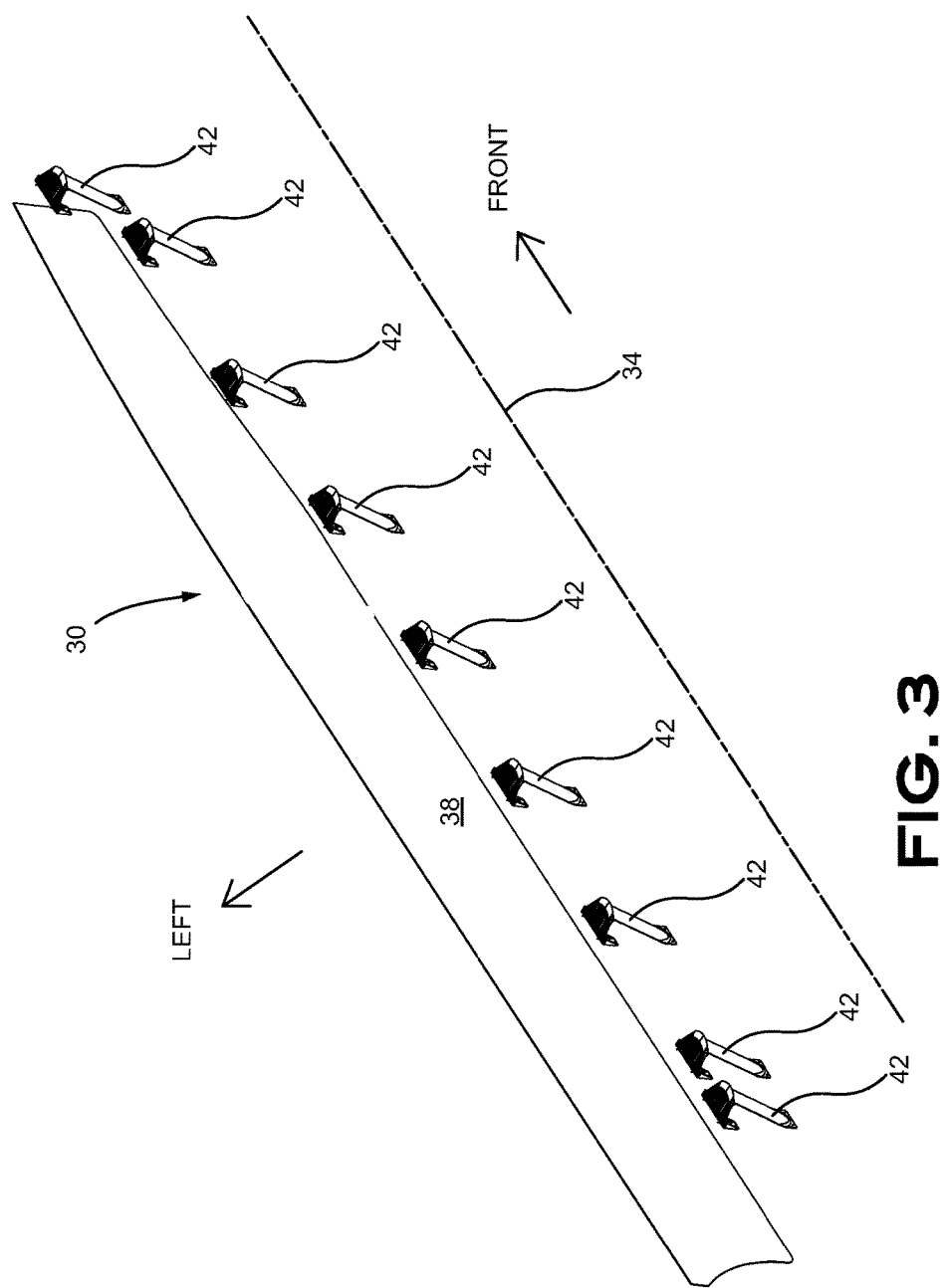
FIG. 3 is an isometric exploded view of an aerodynamic skirt in accordance with at least one embodiment of the invention.

A preferred embodiment of the present invention is described below with reference to the drawings. FIG. 1, FIG. 2 and FIG. 3 illustrate a road tractor 10 with a trailer 20 attached thereto equipped with a pair of skirt assemblies 30, installed on each side of the trailer 20 along a longitudinal axis 34, adapted to deflect and direct the airflow around the trailer 20. Each aerodynamic skirt assembly 30 includes a skirt panel 38, adapted to be disposed on the side of the trailer 20, and a plurality of securing mechanisms 42 adapted to secure the skirt panel 38 to the trailer 20. The securing mechanisms 42 are visible although not clearly illustrated in FIG. 1, FIG. 2 and FIG. 3 and will be discussed in more details below. Once installed on the trailer 20, the skirt assembly 30 helps channel the flow of air around the trailer 20 to reduce the air drag of the vehicle when the trailer 20 moves on the road, pulled by the road tractor 10. One can appreciate from FIG. 1 that the trailer 20 includes slider rail 24 used to adjust the location of the set of wheels 50 on the trailer 20, thus interacting with the length of the skirt panel 38.

The skirt assembly 30 of the present embodiment is mostly located under the trailer 20, between the wheels 46 of the road tractor 10 and the wheels 50 of the trailer 20. The skirt panels 38 can alternatively extend forward up to the trailer supports 54, also known as landing gears, and be secured thereto thus preventing complex skirt panel 38 arrangements through the securing mechanism 42. The skirt panels 38 are substantially vertically positioned on each side of the trailer 20, preferably located as a vertical continuity of the trailer's side/wall, with a clearance with the ground by illustratively about 15-25 centimeters (about 6 to 12 inches).

The air management around the trailer 20 provided by the skirt assembly 30 reduces the air drag created by the trailer 20 by directing the flow of air around the trailer 20. The flow of air would otherwise turbulently move around and below the trailer 20 to create substantial air drag. The airflow management around the trailer 20 provided by the skirt assembly 30 helps maintain laminar airflow around the trailer 20 that diminishes fuel consumption of the road tractor 10. The skirt assembly 30 also improves the safety of the vehicle by providing a barrier that can substantially restrict objects to get under the trailer 20.

As illustrated, the skirt panel 38 is shaped with an optional progressive height 62 from a front portion 58 thereof. The skirt panels 38 can alternatively also be installed at an angle, in respect to the vertical (not illustrated), on the trailer 20 to change the airflow pattern around the trailer 20 and more precisely adjust the aerodynamics to a specific vehicle shape.

It can be appreciated in FIG. 2 that each skirt panel 38 is installed directly on the side of the trailer 20 and, when seen from above, the front portion 58 that optionally progressively proximally leans angle 66 toward the center 34 of the trailer 20. The recessed front portion 58 of the skirt panel 38 improves the management of turbulent airflow generated by the road tractor 10 thus improving the aerodynamic efficiency of the skirt assembly 30. Additional explanation about the shape of the skirt panel 38 will be provided in further details below.

Figure 4:
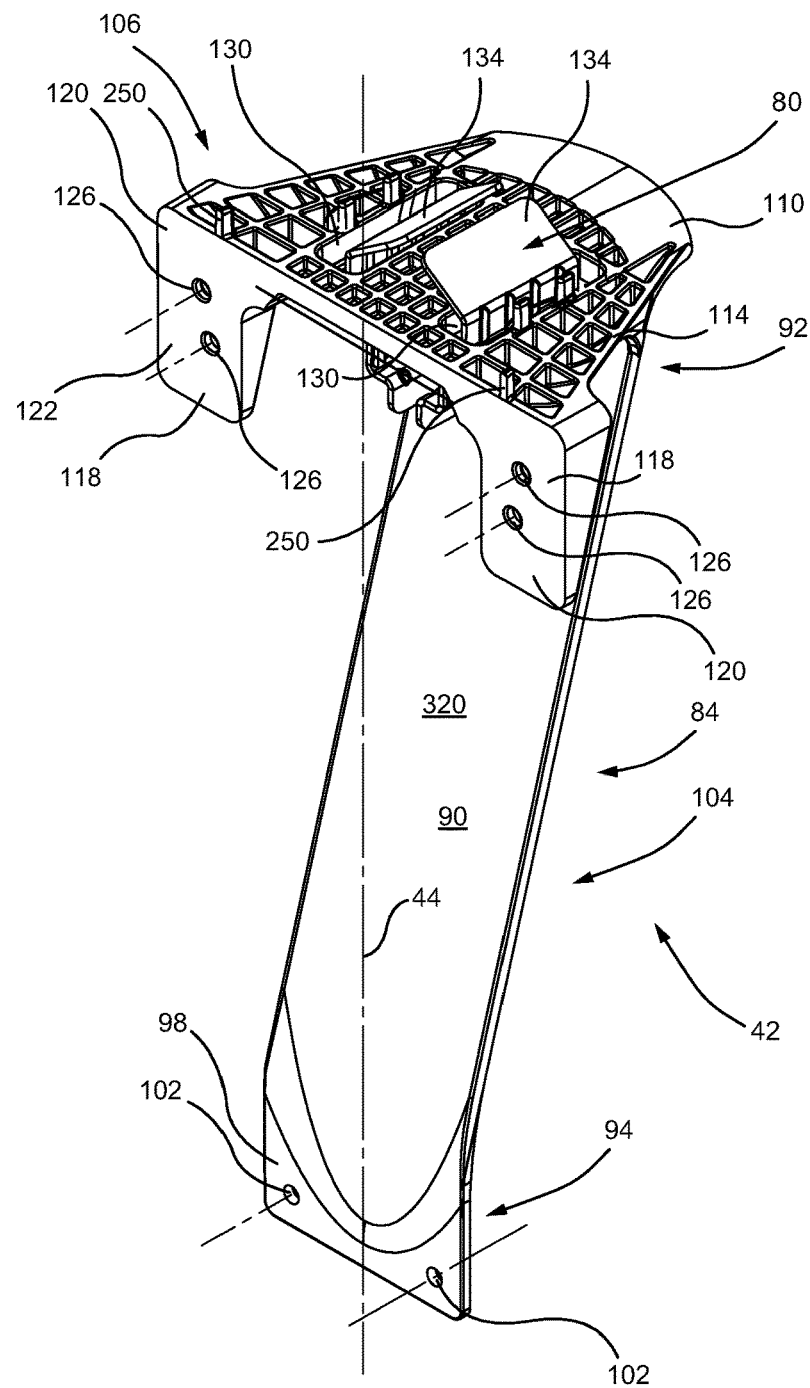
FIG. 4 is an isometric view of a strut in accordance with at least one embodiment of the invention.
Figure 5:
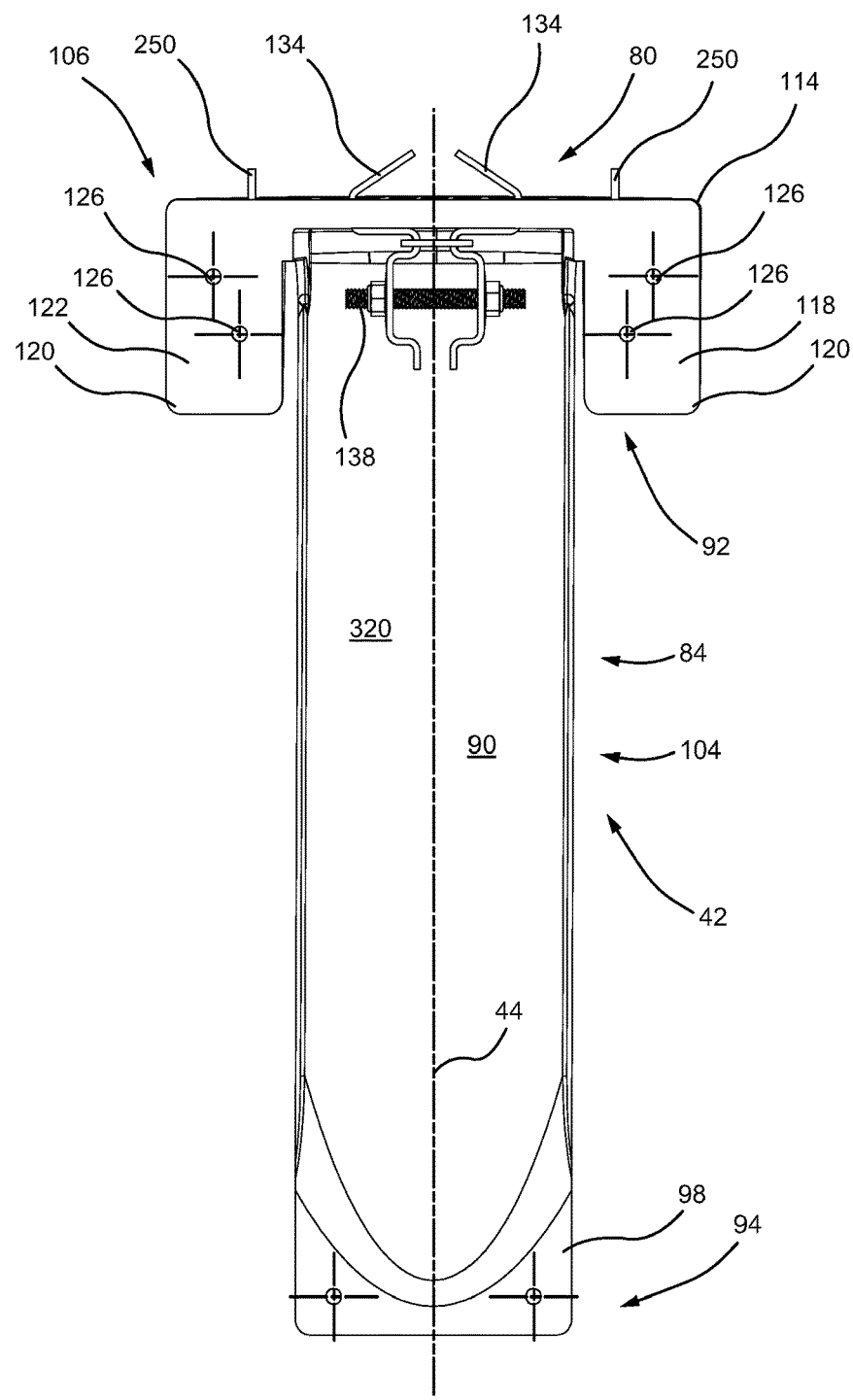
FIG. 5 is a front elevation view of a strut in accordance with at least one embodiment of the invention.
Figure 6:
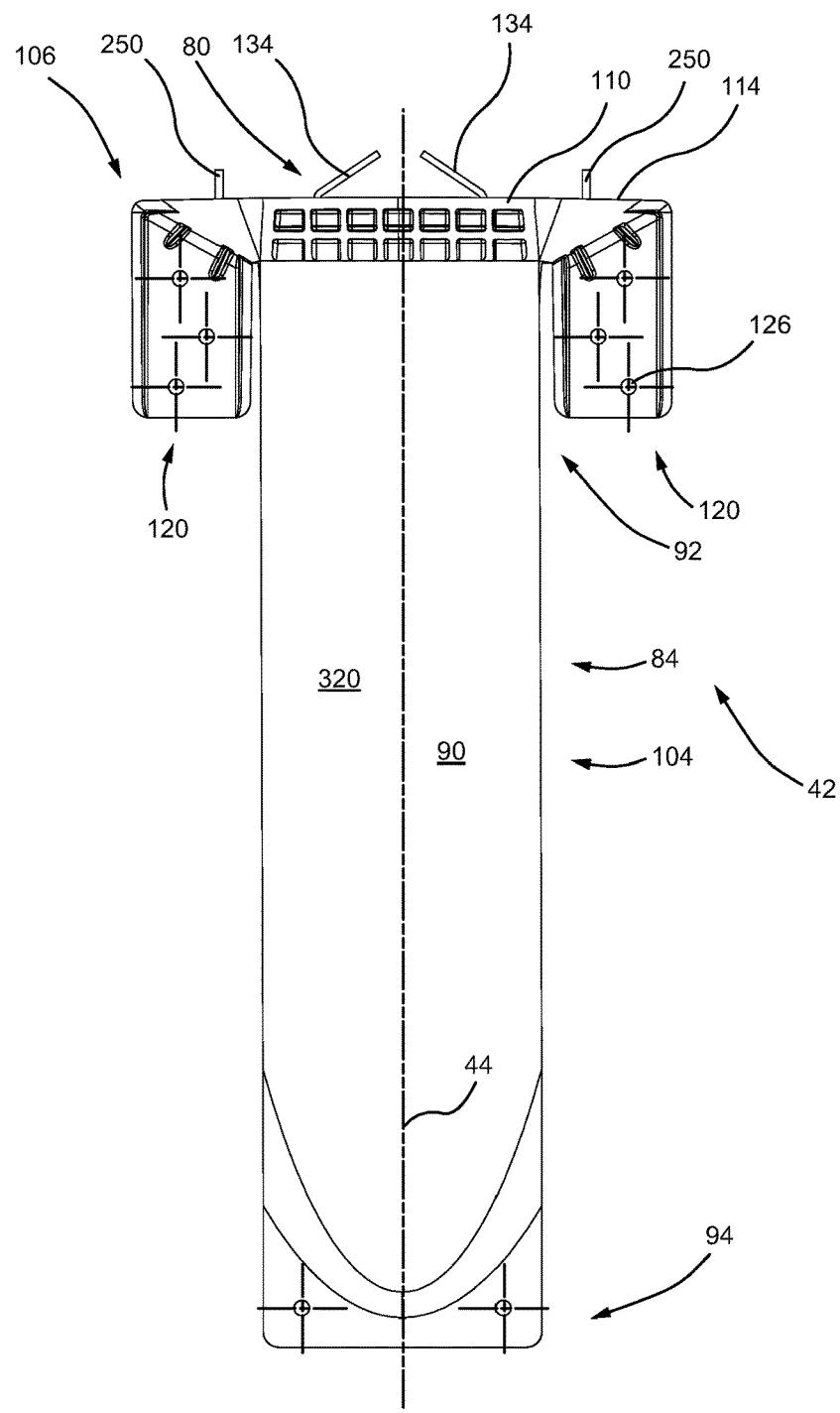
FIG. 6 is a back elevation view of a strut in accordance with at least one embodiment of the invention.
Figure 7:
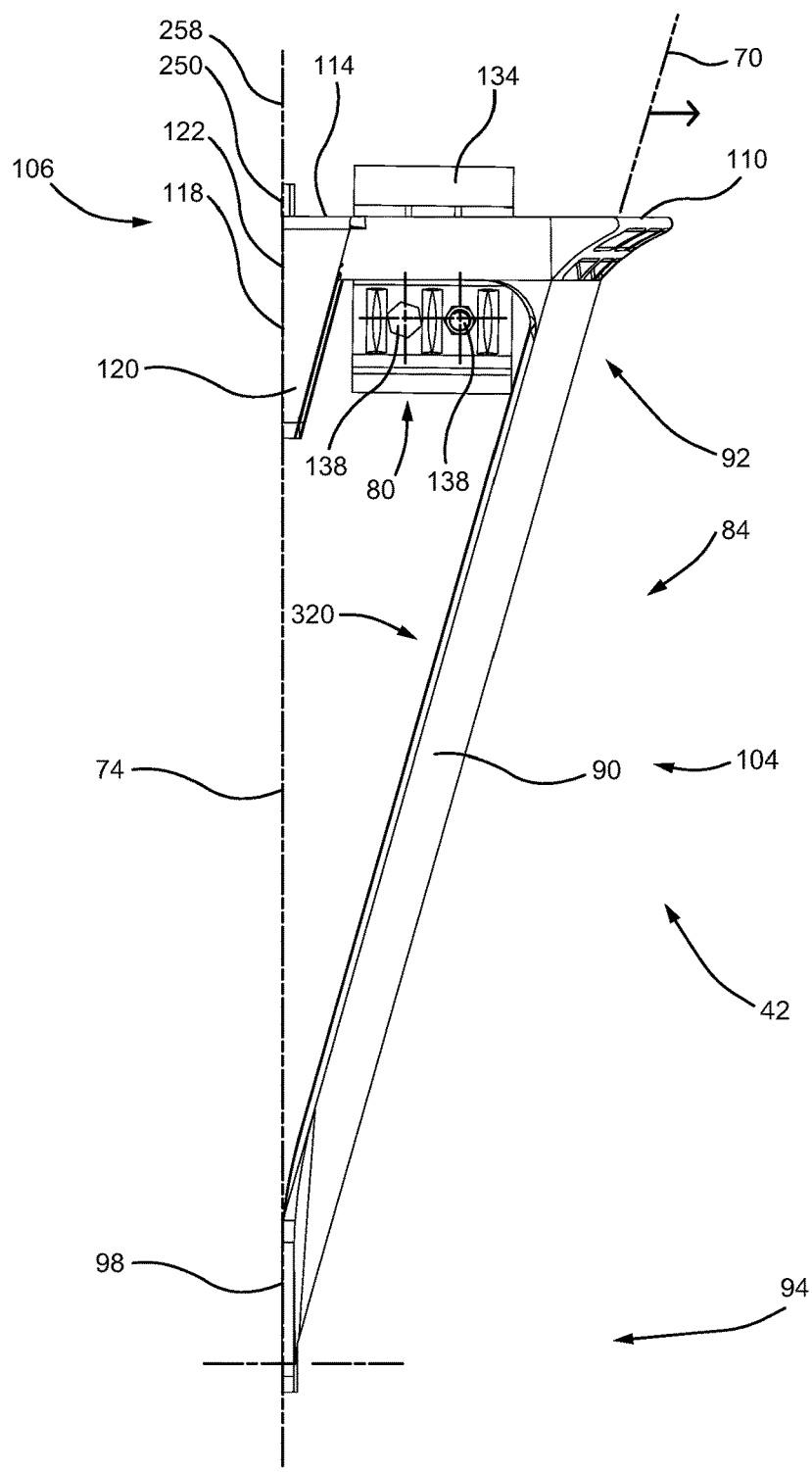
FIG. 7 is a side elevation view of a strut in accordance with at least one embodiment of the invention.
Figure 8:
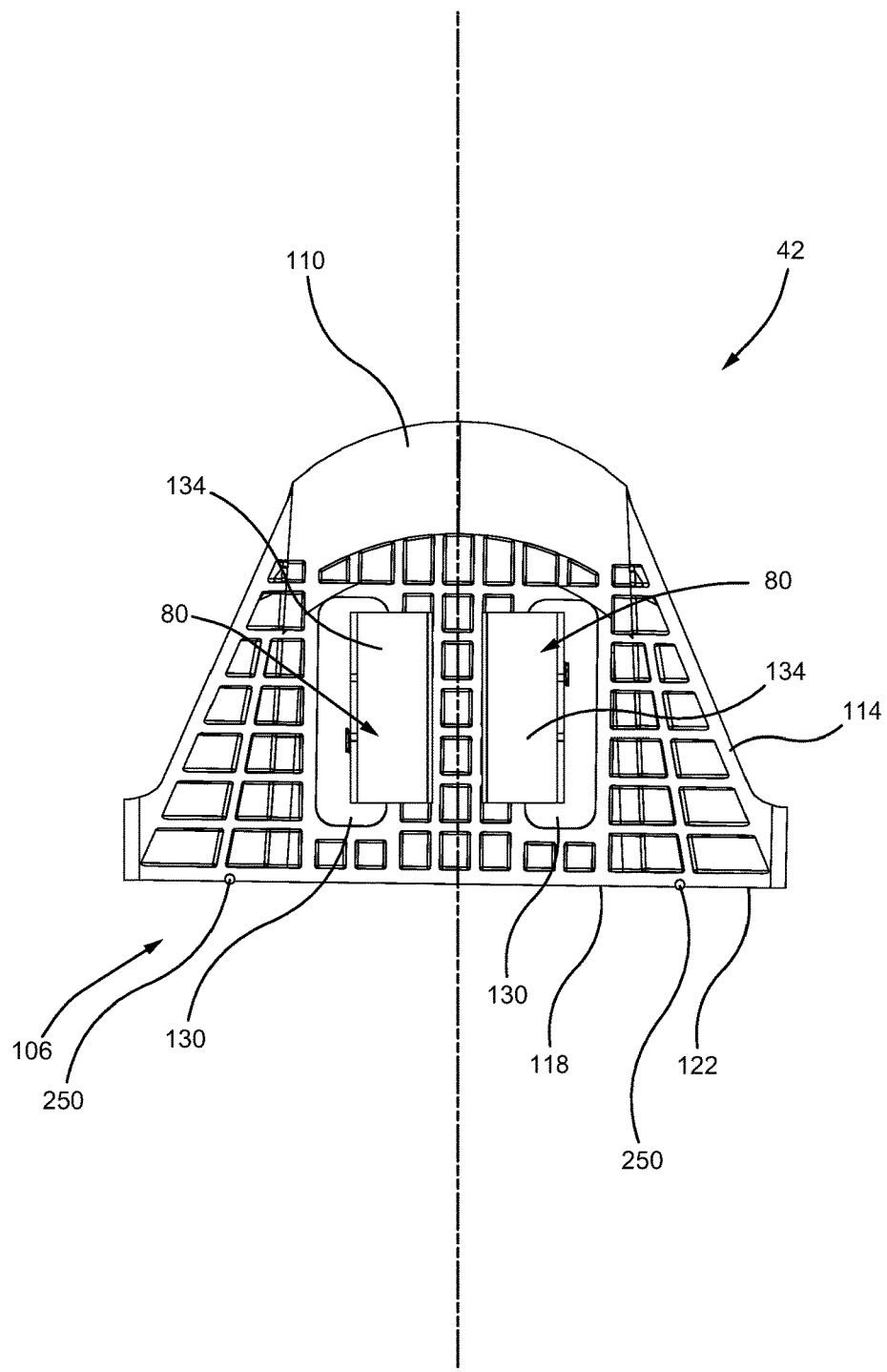
FIG. 8 is a top plan view of a strut in accordance with at least one embodiment of the invention.
Figure 9:
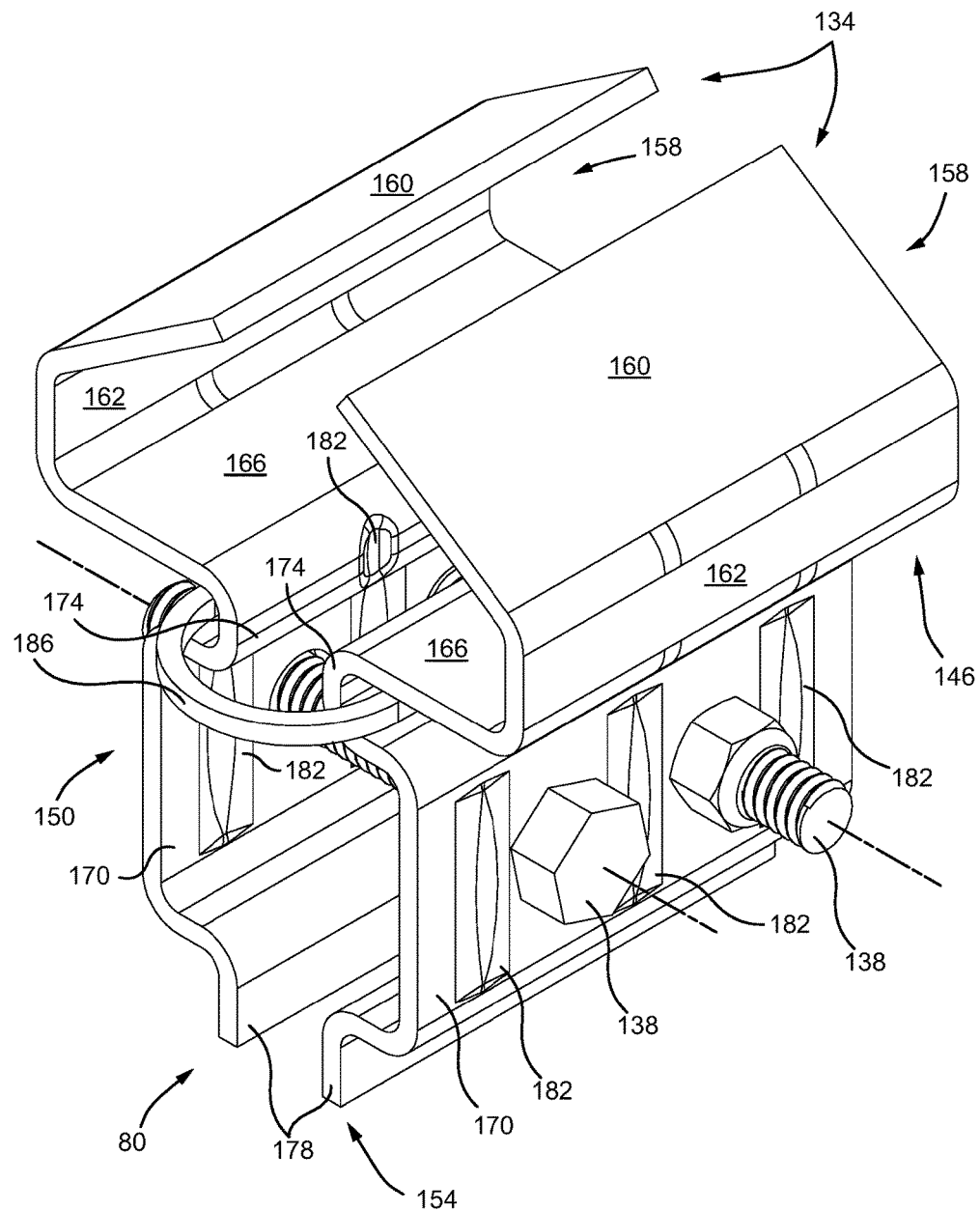
FIG. 9 is an isometric view of a securing mechanism in accordance with at least one embodiment of the invention.

FIG. 4 throughout FIG. 8 are illustrating a securing mechanism 42 including a connector portion 80 and a strut portion 84 both centered along vertical axis 44. The strut portion 84 includes a strut member 90, with a flex portion 104 thereof, securing the skirt panel 38 to a lower portion 94 thereof. In the illustrated embodiment, a planar section 98 includes holes 102 therein for securing the lower portion 94 of the skirt panel 38 with fasteners or rivets, for example. The strut portion 84 includes a securing portion 106 to which is connected the strut portion 84. The securing portion 106 includes a stabilizer 110, a trailer contacting portion 114, a skirt panel contacting portion 118 and a pair of securing wings 120. A stabilizer 110 is located proximal to the longitudinal axis 34 of the trailer 20 when installed on a trailer 20, proximally extending from a projection 70 of the strut member 90 to create a lever that help sustains the loads applied on the strut portion 84 by the skirt panel 38. The skirt panel contacting portion 118 includes a planar section 122 provided with a series of holes 126 therein for securing an upper portion 92 of the skirt panel 38 with fasteners or rivets, for example. Both planar section 98, 122 are preferably aligned along a unique vertical plane 74 for efficiently contacting the skirt panel 38. The trailer contacting portion 114 includes openings 130 therein to receive therein the connector portion 80 for securing the strut portion 84 to the trailer 20.

Figure 13:
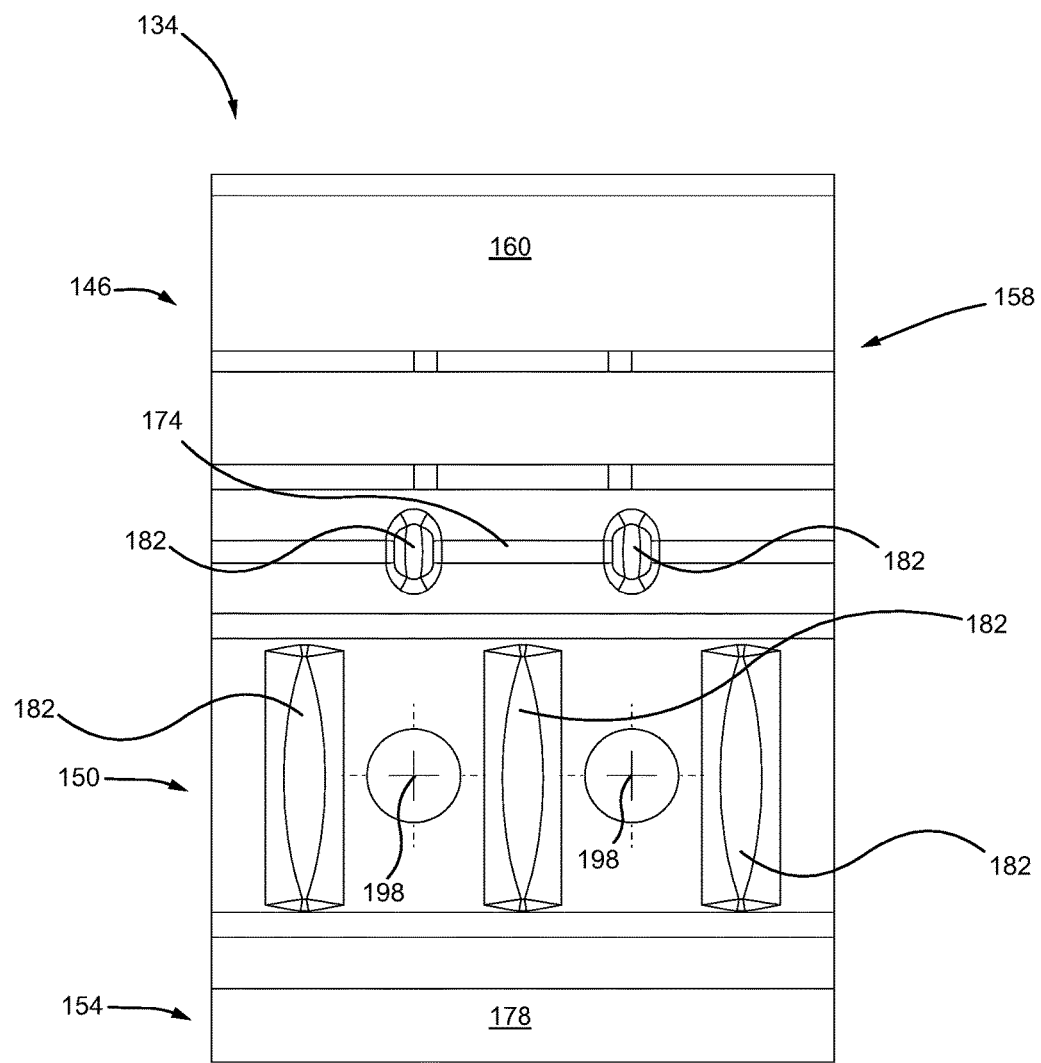
FIG. 13 is a front elevation view of a portion of a securing mechanism in accordance with at least one embodiment of the invention.
Figure 14:
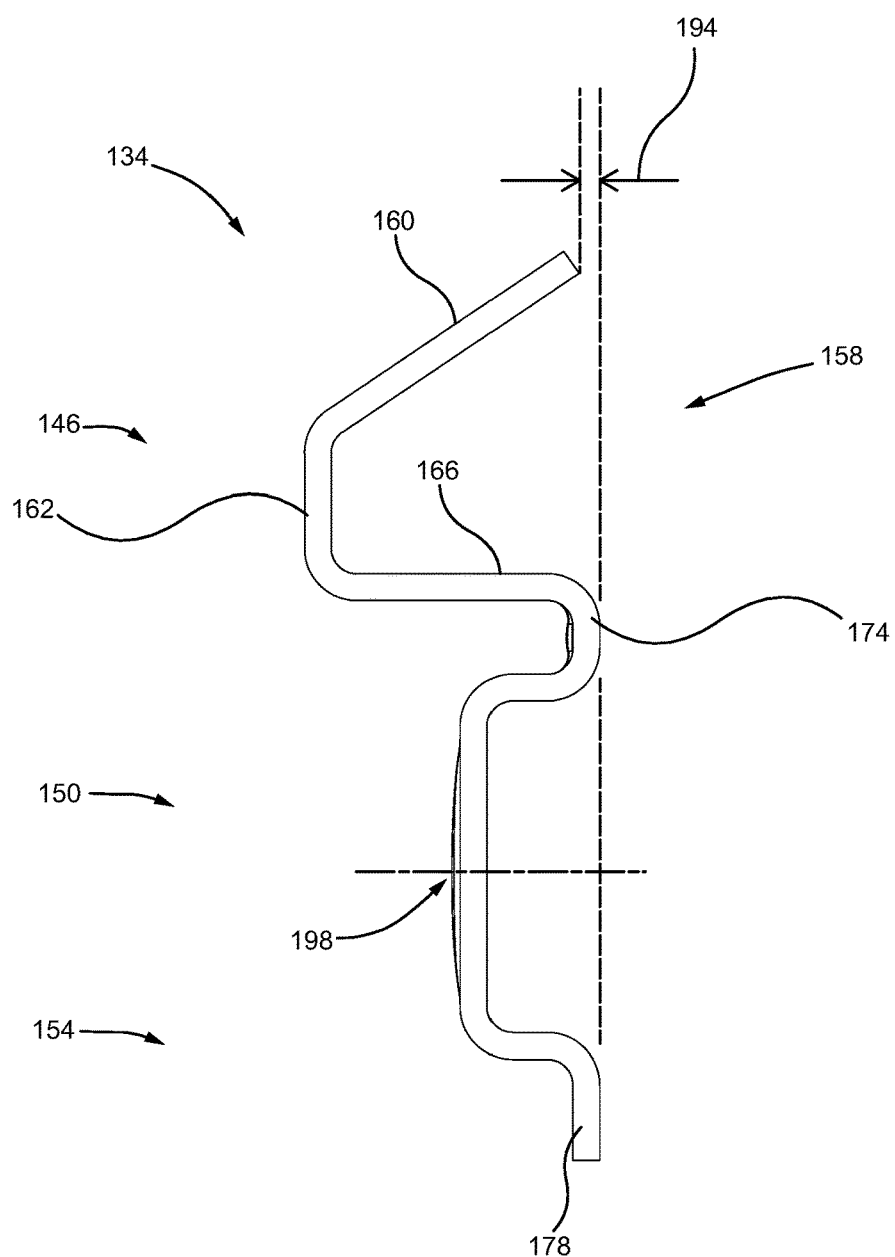
FIG. 14 is a side elevation view of a securing mechanism in accordance with at least one embodiment of the invention

The connector portion 80 is embodied as two opposed clamps 134 configured to be secured together with, for instance, two fasteners 138. The two opposed clamps 134 are securing together the trailer contacting portion 114 of the strut portion 84 with a lower portion of an I-beam as illustrated in FIG. 13 throughout FIG. 18. Each clamp 134 uses an inclined member 160 and two contacting portions 162, 166 for securing the connector portion 80 with the I-beam 142. However, we will first describe in further details the connector portion 80 before discussing the interaction between the strut portion 84, the connector portion 80 and the I-beam 142.

Figure 10:
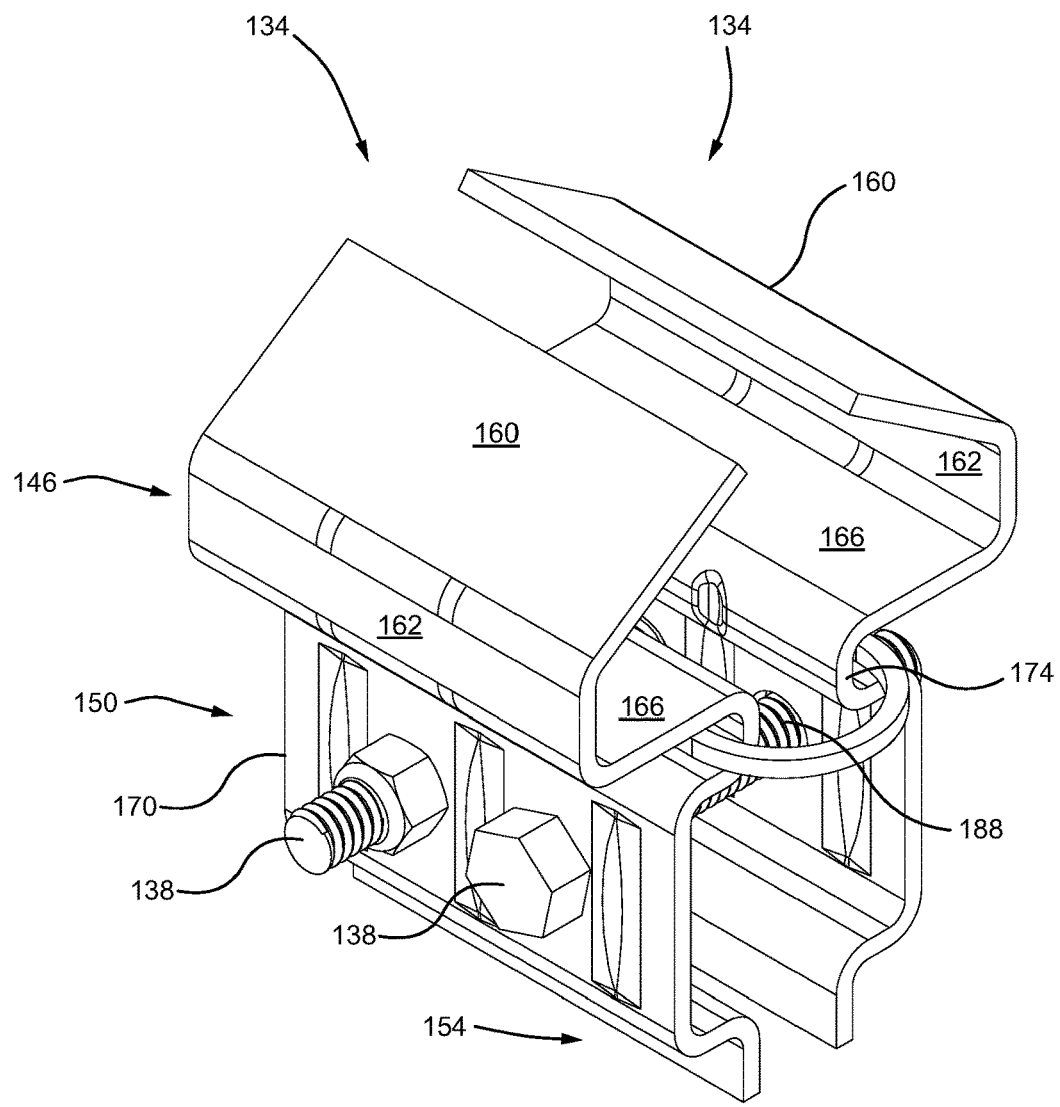
FIG. 10 is an isometric view of a securing mechanism in accordance with at least one embodiment of the invention.
Figure 11:
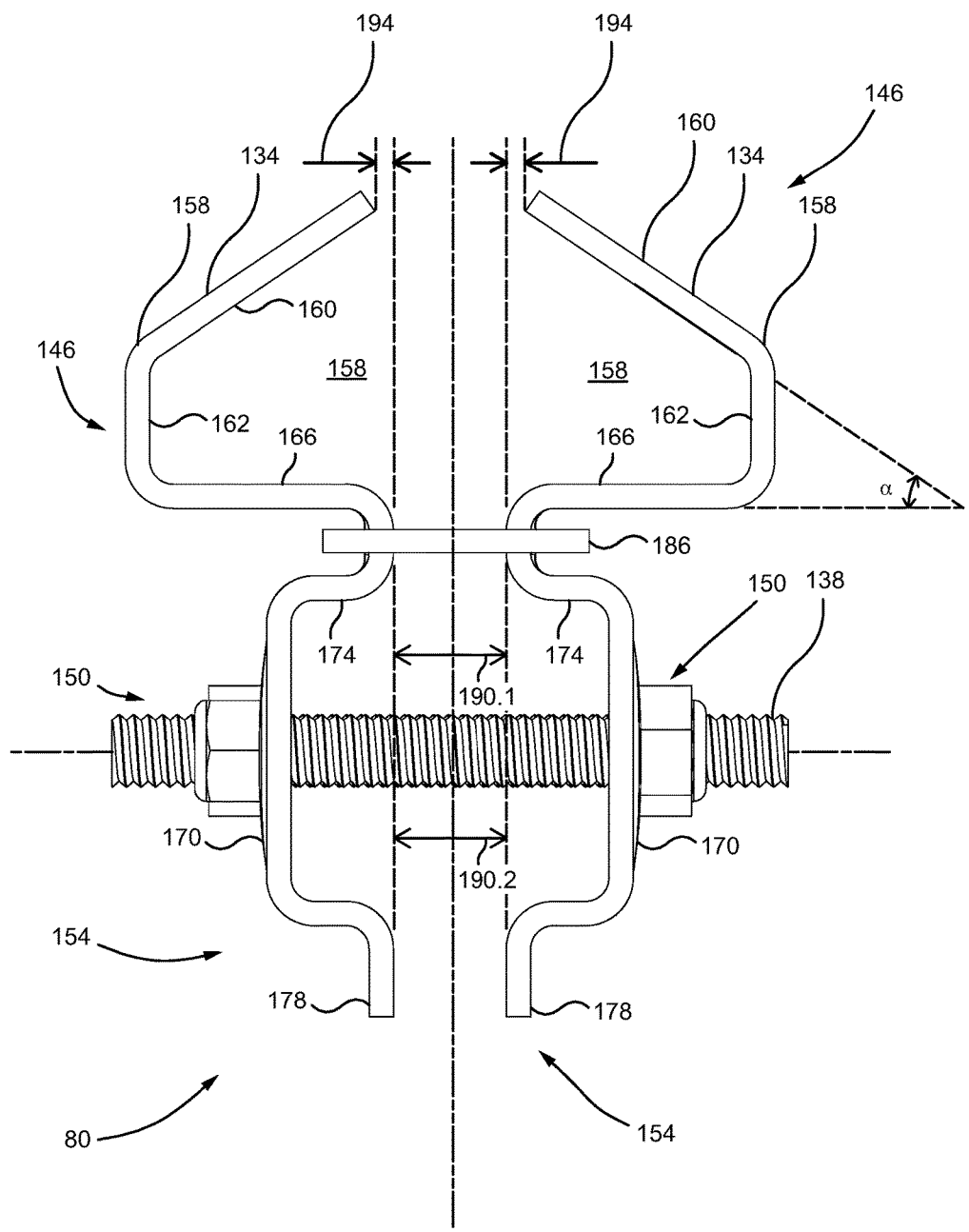
FIG. 11 is a side elevation view of a securing mechanism in accordance with at least one embodiment of the invention
Figure 12:
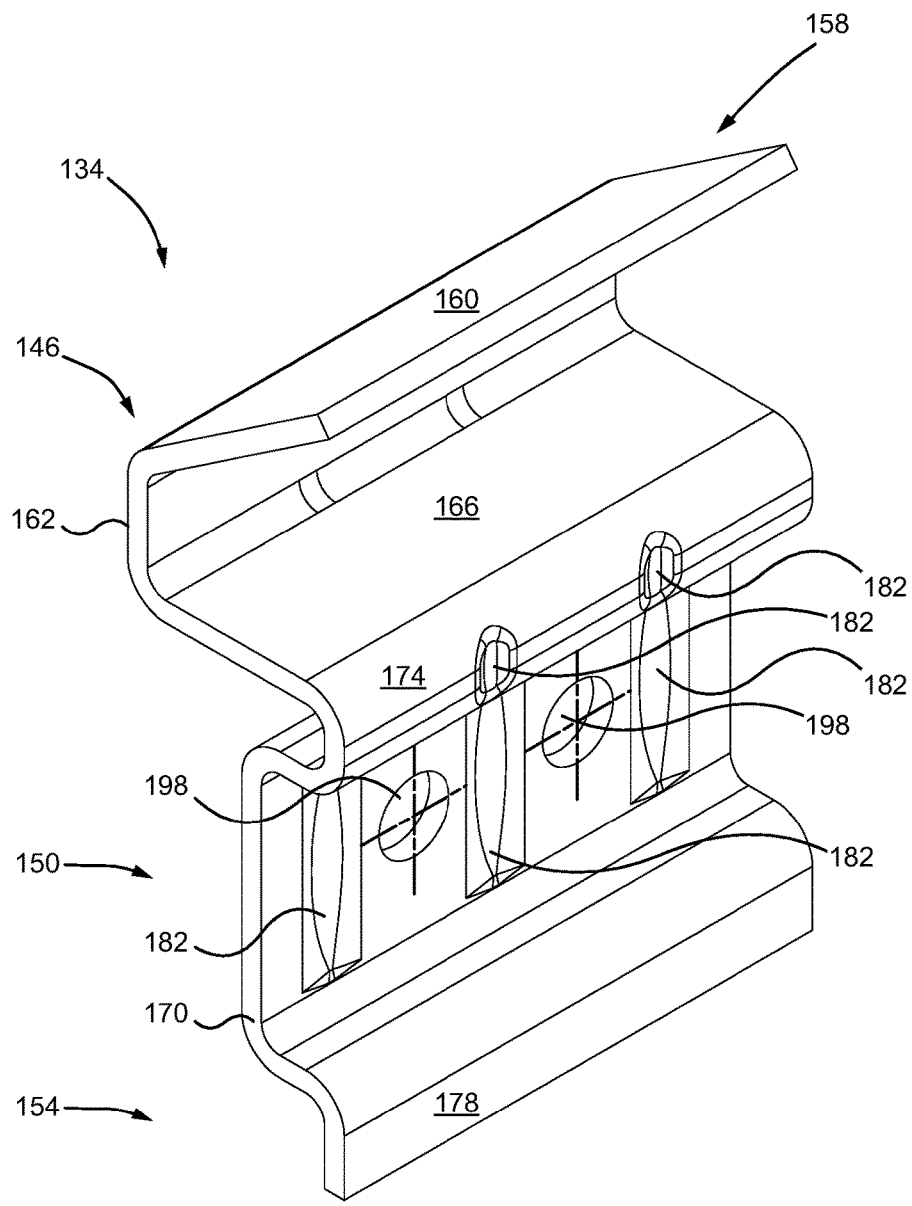
FIG. 12 is an isometric view of a portion of a securing mechanism in accordance with at least one embodiment of the invention.

Moving now to FIG. 10 throughout FIG. 11, a connector portion 80 is illustrated. The connector portion 80 is preferably made of two similar opposed clamps 134 to simplify the assembly and reduce the manufacturing cost. The clamps 134 are made of a strong material capable of withstanding significant mechanical loads and can be shaped with a punch and die process. Metal, or the like, can be used. A material resistant to corrosion, or a protective layer, is also desirable given the condition of use of the connector portion 80 to prevent rust to undesirably attack the connector portion 80.

Each clamp 134 is, in the present embodiment, made of bent sheet metal that is forming a collecting portion 146, a securing portion 150 and a contacting portion 154. The collecting portion 146 includes a collecting member 158 embodied as an inclined member 160 positioned at an angle α, that is about between 30 degree and about 45 degree, and more preferably about 34 degree in the illustrated embodiment, to collect therein sections of I-beams 142 having different dimensions and thicknesses. The collecting member 158 merges into a first contacting portion 162, configured to laterally abut sides of an I-beam 142, that merges into a second contacting portion 166 configured to vertically contact a surface of the connector portion 80. A securing portion 170 is formed between a first protruding member 174 and a second protruding member 178. Both members 174, 178 are extending about a similar distance to allow leveled abutment of the two clamps 134 when secured and pulled toward each other with an intervening I-beam 142 having optimal dimensions. The second protruding member 178 is also helpful to prevent premature rotation of the assembly when tightening the bolts 138 by its lever action and touching each other along a line to provide resistance to rotation to the assembly. Additional bents 182 are performed on the clamp 134 to increase the mechanical strength thereof. An elastic member 186, embodied as an elastic band in the embodiment, is used to keep both clamps 134 together in clamping position prior to secure the clamps 134 to the I-beam 142. Helical springs 188 can optionally be used to pretense the assembly as illustrated in FIG. 10. The pre-assembly of the two clamps 134 are allowing suspending the pre-assembly of the two clamps 134 to the I-beam 1 to connect the parts of the aerodynamic skirt assembly 30 in place before securing them in a final operating configuration. Distance 190 is preferably configured to be close to zero (0) when the two clamps are secured toward each other and two times distance 194 is preferably configured to be close to a thickness of a central member of the I-beam 142 when the clamps 134 are secured to a narrow I-beam 142. Conversely, distance 190.1 and 190.2 is going to increase when the clamps 134 are secured to a wider I-beam. Holes 198 are made in the securing portion 170 to accommodate bolts 138 therein to secure both clamps 134 together. The interaction of the securing mechanism 42 with an I-beam 142 is depicted in FIG. 15 throughout FIG. 16.

Figure 18:
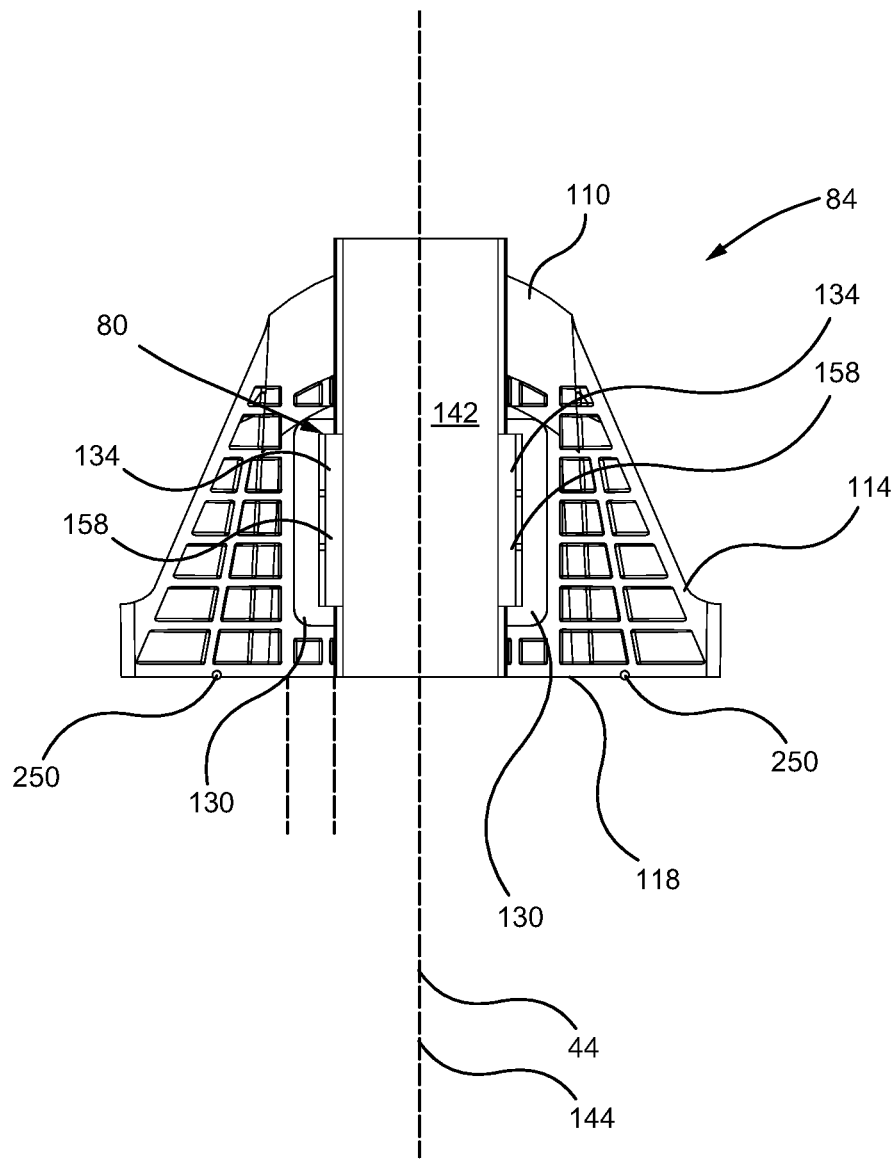
FIG. 18 is a top plan view of a strut attached to a trailer's floor beam in accordance with at least one embodiment of the invention.
Figure 19:
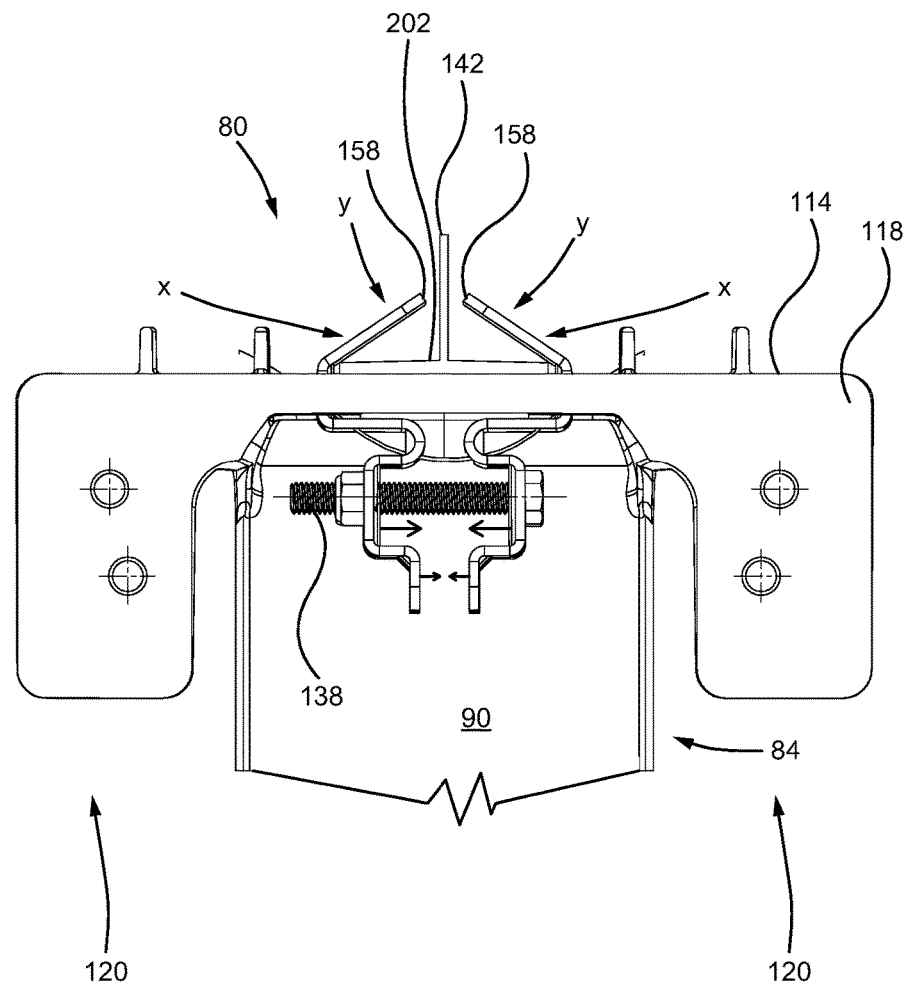
FIG. 19 is a front elevation view of a portion of a strut attached to a trailer's floor beam in accordance with at least one embodiment of the invention.
Figure 20:
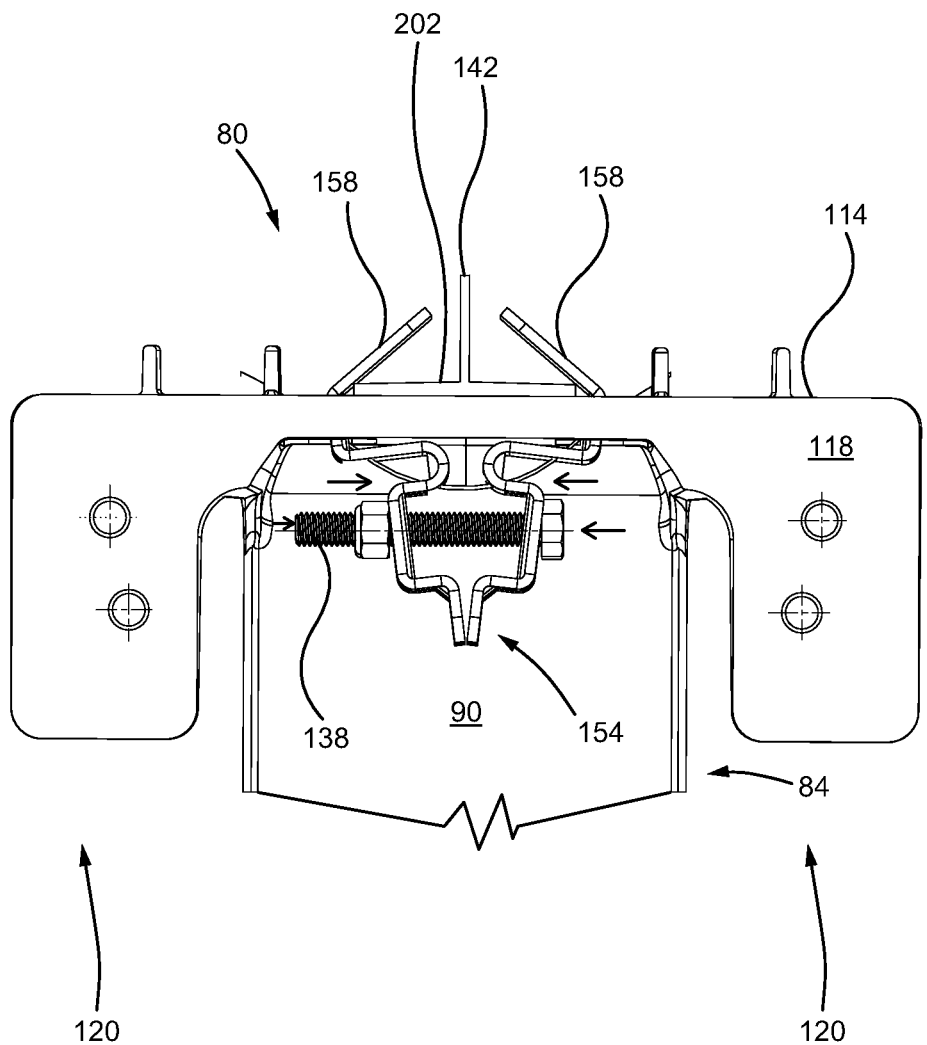
FIG. 20 is a front elevation view of a portion of a strut attached to a trailer's floor beam in accordance with at least one embodiment of the invention.

It can be appreciated from FIG. 13 throughout FIG. 18, the collecting portion 146, with the inclined member 160, is compressing together vertically (y) and laterally (x) the trailer-contacting portion 114 and a lower portion 202 of the I-beam 142. The illustrated structure also has the capacity to adapt to a variety of I-beams 142. The lower portion 202 (bottom flange) of the I-beam can be wider 206 and/or thicker 210 and still be captured and secured by the connection portion 90 of the securing mechanism 42. Typically, the lower portion 202 of the I-beam 142 is illustratively varying from about 38 mm to about 80 mm width, and thickness of about 3 mm to about 13 mm. This is illustrated in FIG. 19 and in FIG. 20.

Figure 17:
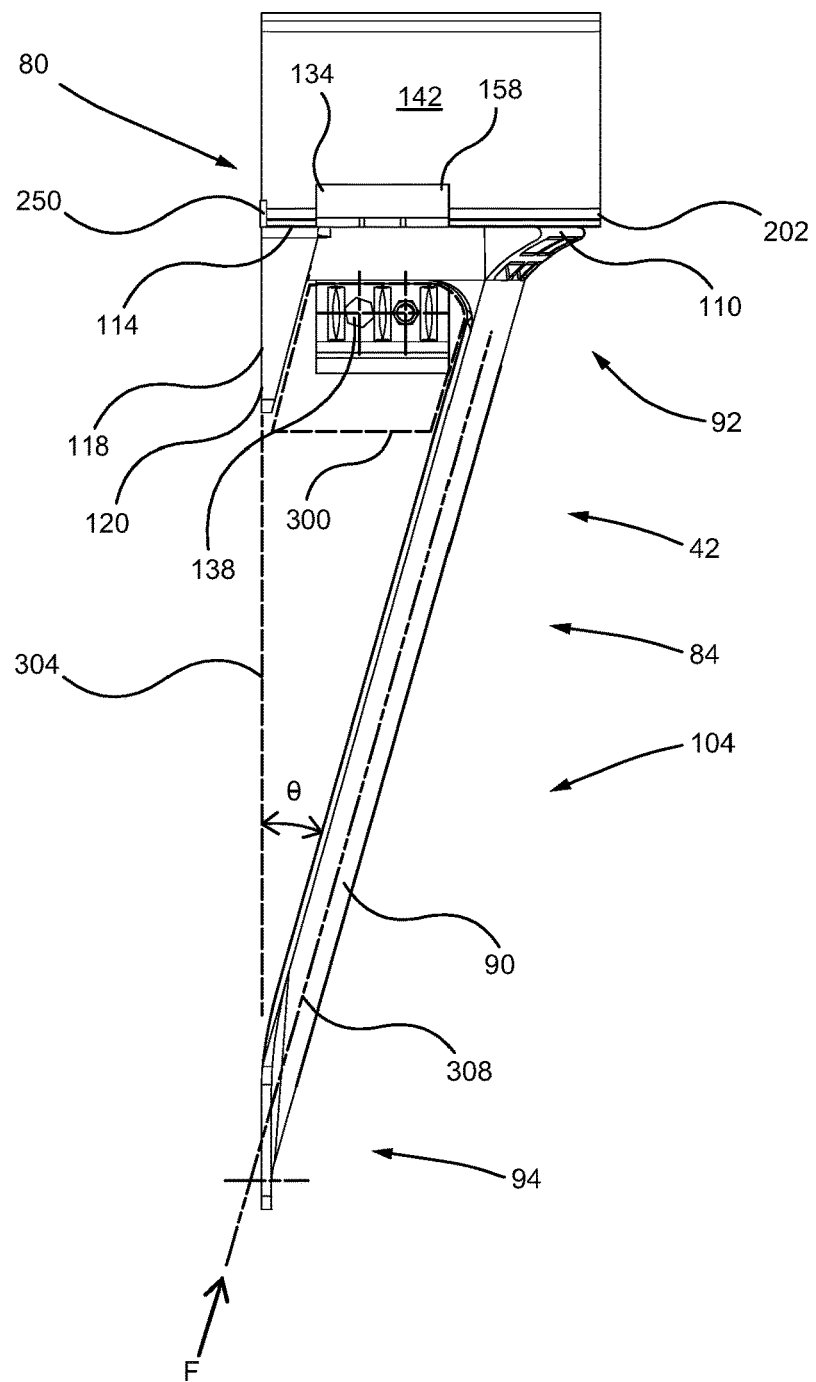
FIG. 17 is a side elevation view of a strut attached to a trailer's floor beam in accordance with at least one embodiment of the invention.

As identified in FIG. 17, the strut portion 84 is, for instance, sized and designed to buckle when a force F of about between 400 N to 600 N is applied along the longitudinal axis 308. The buckling force F can alternatively be between about 450 N to 550 N. A narrower range of force F can alternatively be between about 470 N to 520 N without departing from the scope of the present invention. Corresponding force applied normal to the skirt panel can be inferred from the axial buckling force above.

Figure 15:
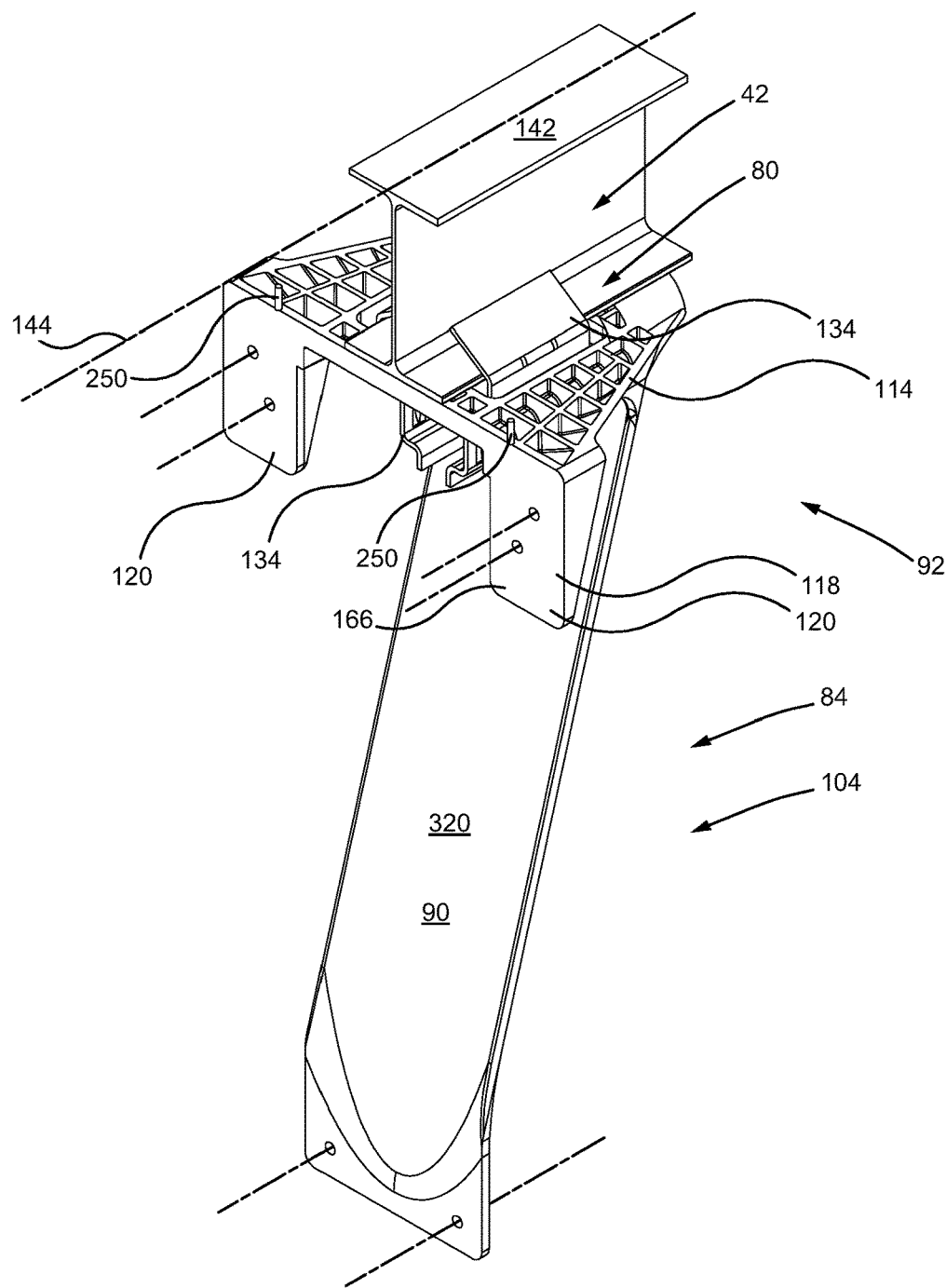
FIG. 15 is an isometric view of a strut attached to a trailer's floor beam in accordance with at least one embodiment of the invention.
Figure 16:
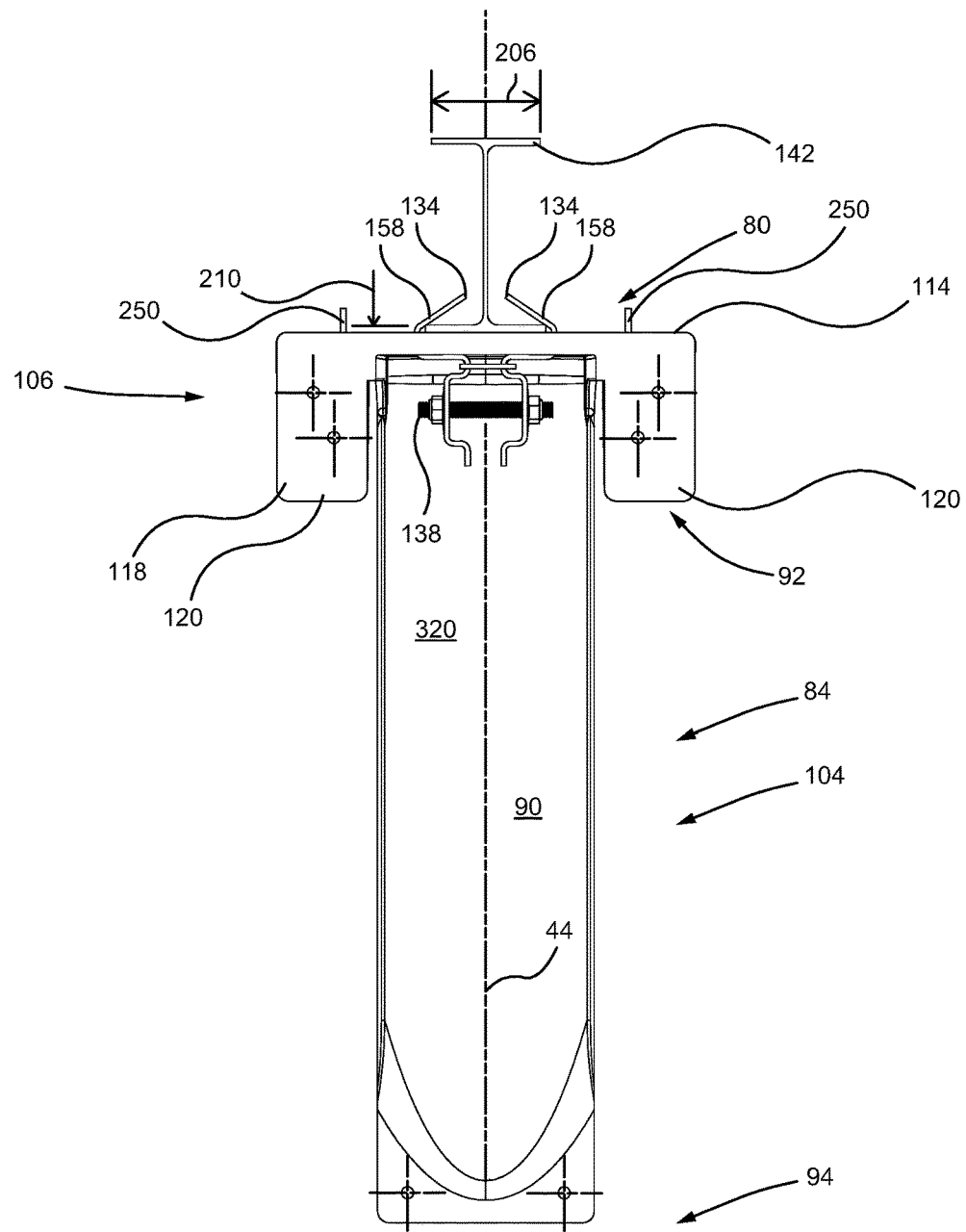
FIG. 16 is a front elevation view of a strut attached to a trailer's floor beam in accordance with at least one embodiment of the invention.
Figure 21:
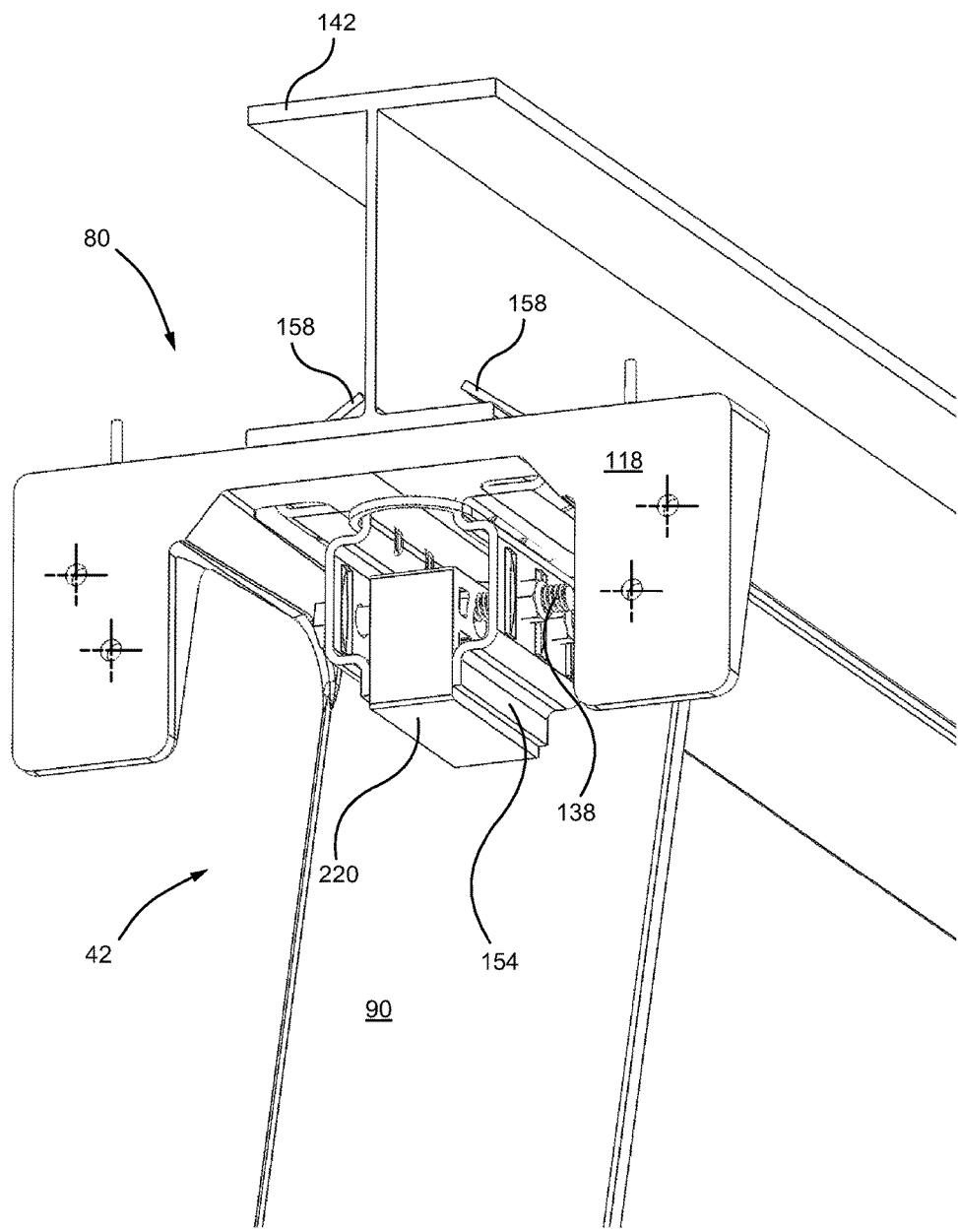
FIG. 21 is an isometric view of a portion of a strut attached to a trailer's floor beam in accordance with at least one embodiment of the invention.
Figure 22:
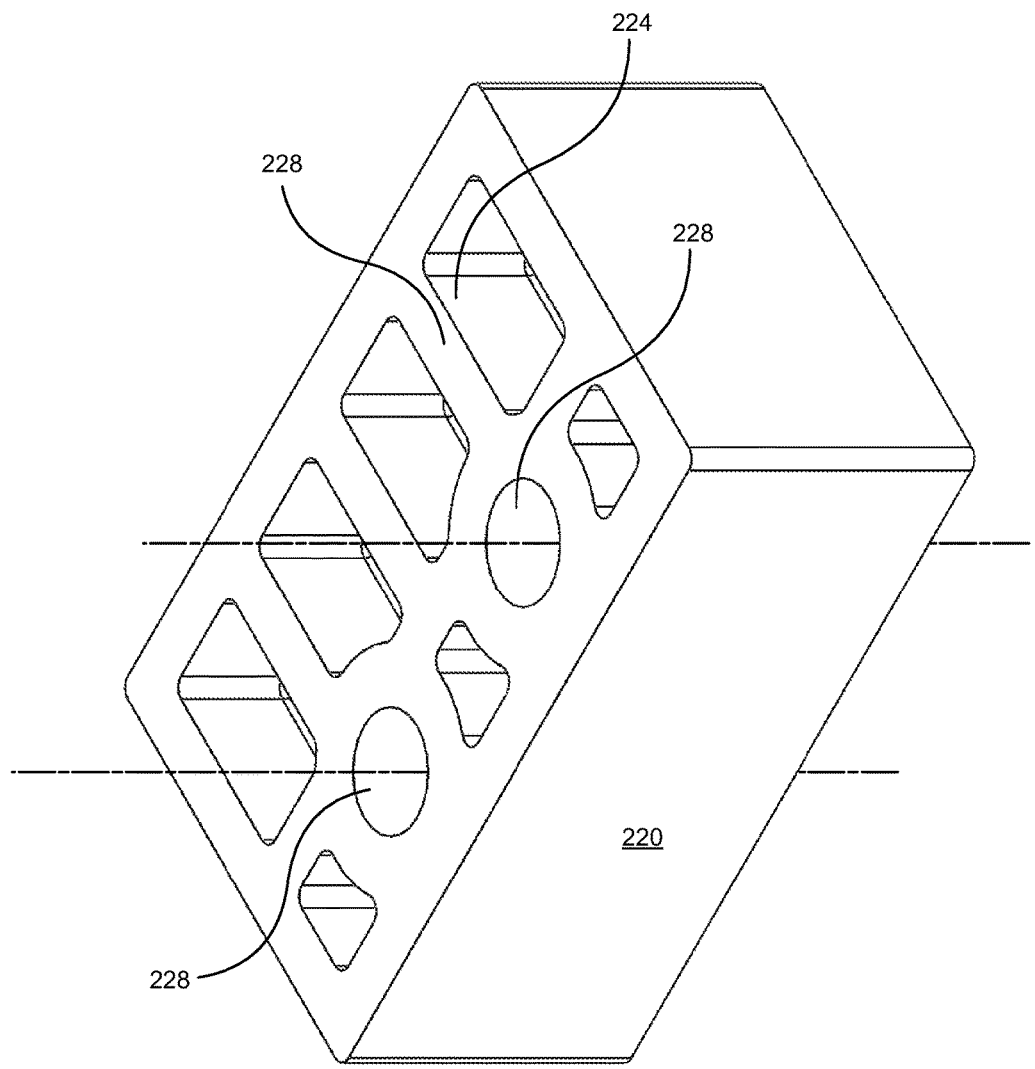
FIG. 22 is a perspective view of a portion of a securing mechanism in accordance with at least one embodiment of the invention.
Figure 23:
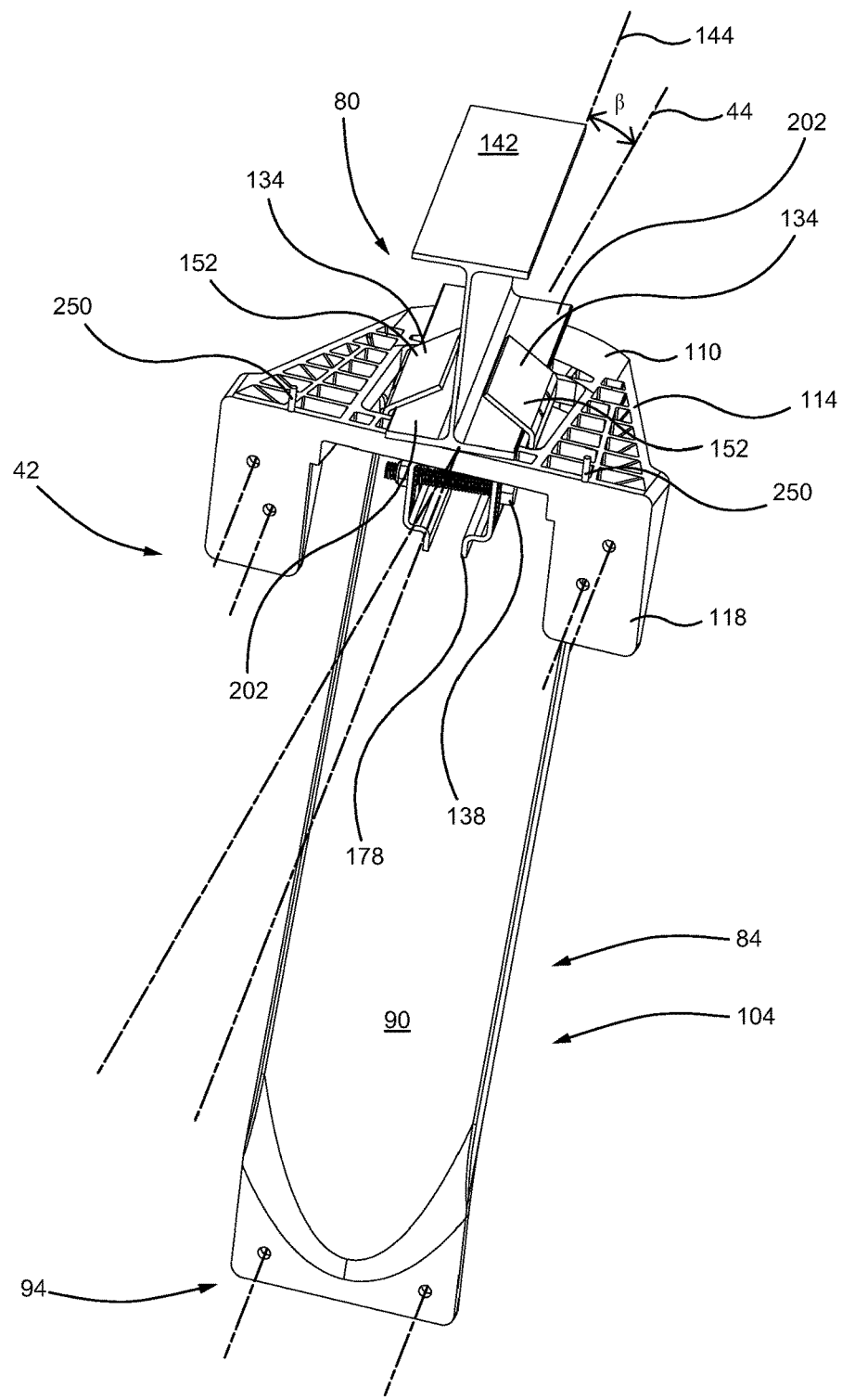
FIG. 23 is an isometric view of a strut attached to a trailer's floor beam in accordance with at least one embodiment of the invention.
Figure 24:
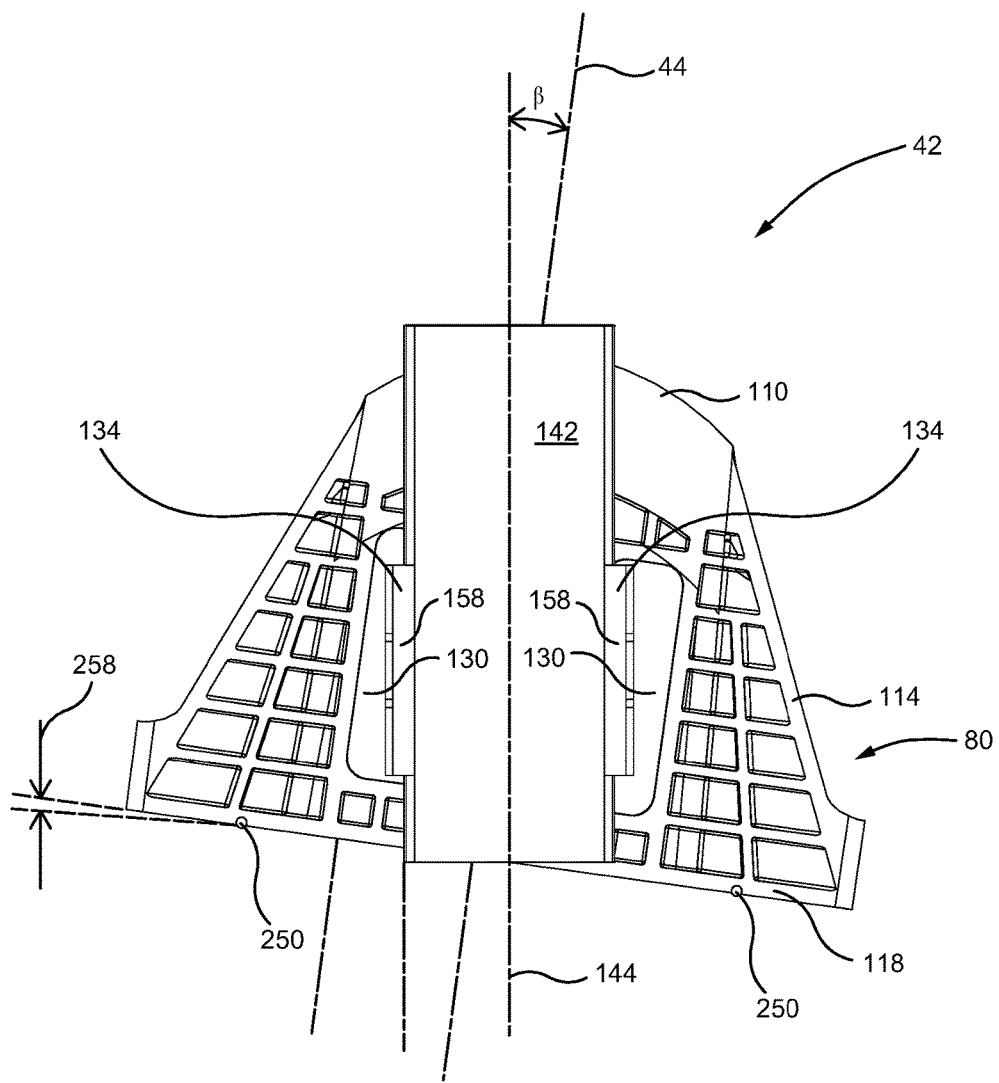
FIG. 24 is a top plan view a strut attached to a trailer's floor beam in accordance with at least one embodiment of the invention.
Figure 25:
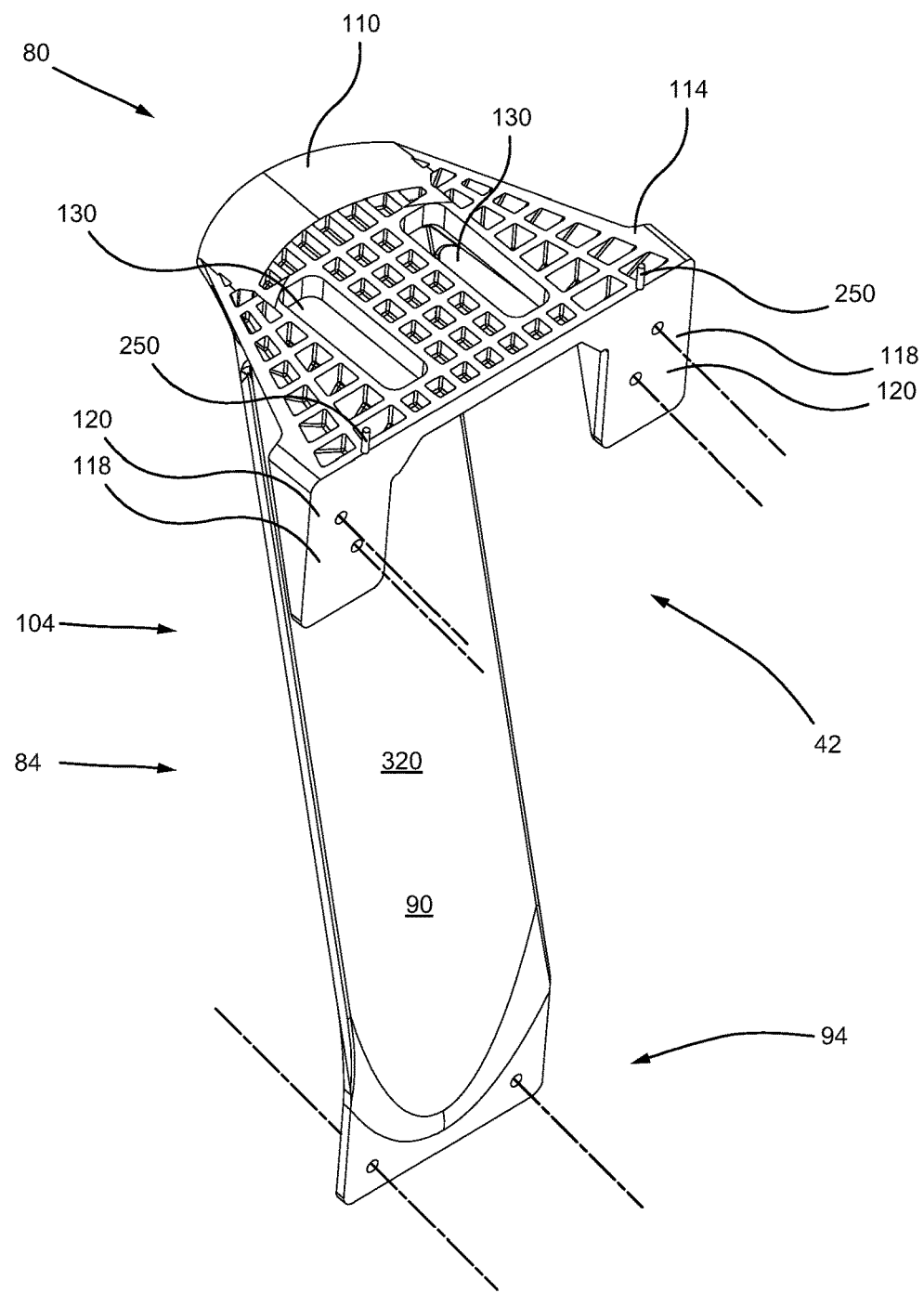
FIG. 25 is an isometric view of a strut in accordance with at least one embodiment of the invention.

One can appreciate the I-beam 142 is parallel with the central axis 144 of the I-beam 142 in FIG. 15 throughout FIG. 21 and in FIG. 23 and FIG. 24. The securing mechanism 42 is constructed to keep the pair of clamps 134 aligned and allow misalignment of the strut portion 84 in respect with the I-beam 142 of the trailer 42. The alignment between the clamps 134 can be made by contacting the contacting portions 154 together. However, in a case of a wider I-beam 142, a spacer 220 can be required to space apart the contacting portions 154. The spacer 220, better seen in FIG. 22 can be made of different material having suitable mechanical properties like steel, aluminum or plastic. The spacer 220 includes optional voids 224 and ribs 228 to lighten the spacer 220, reduce curing time, eliminate sink marks and reinforce desirable areas thereof. The spacer further includes fastener-receiving portions 228 configured to receive fasteners 138 therein. A misalignment between the strut portion 84 and the I-beam 142 of the trailer 42 can occur if the trailer 20 has I-beams 142 that are not perfectly aligned and, depending of the installation configuration of the skirt panel 38 along the trailer 20, the front portion 58 of the skirt panel 38 can proximally lean toward the center of the trailer 20 hence progressively curving or bending and be located at an angle with the I-beam 142 of the trailer 20 as illustrated in FIG. 23 and FIG. 24. The size of the openings 130 is designed to accommodate a flexible installation of the pair of clamps 134 that can be located to accommodate position variation with, for instance, an angle β thereof.

Figure 29:
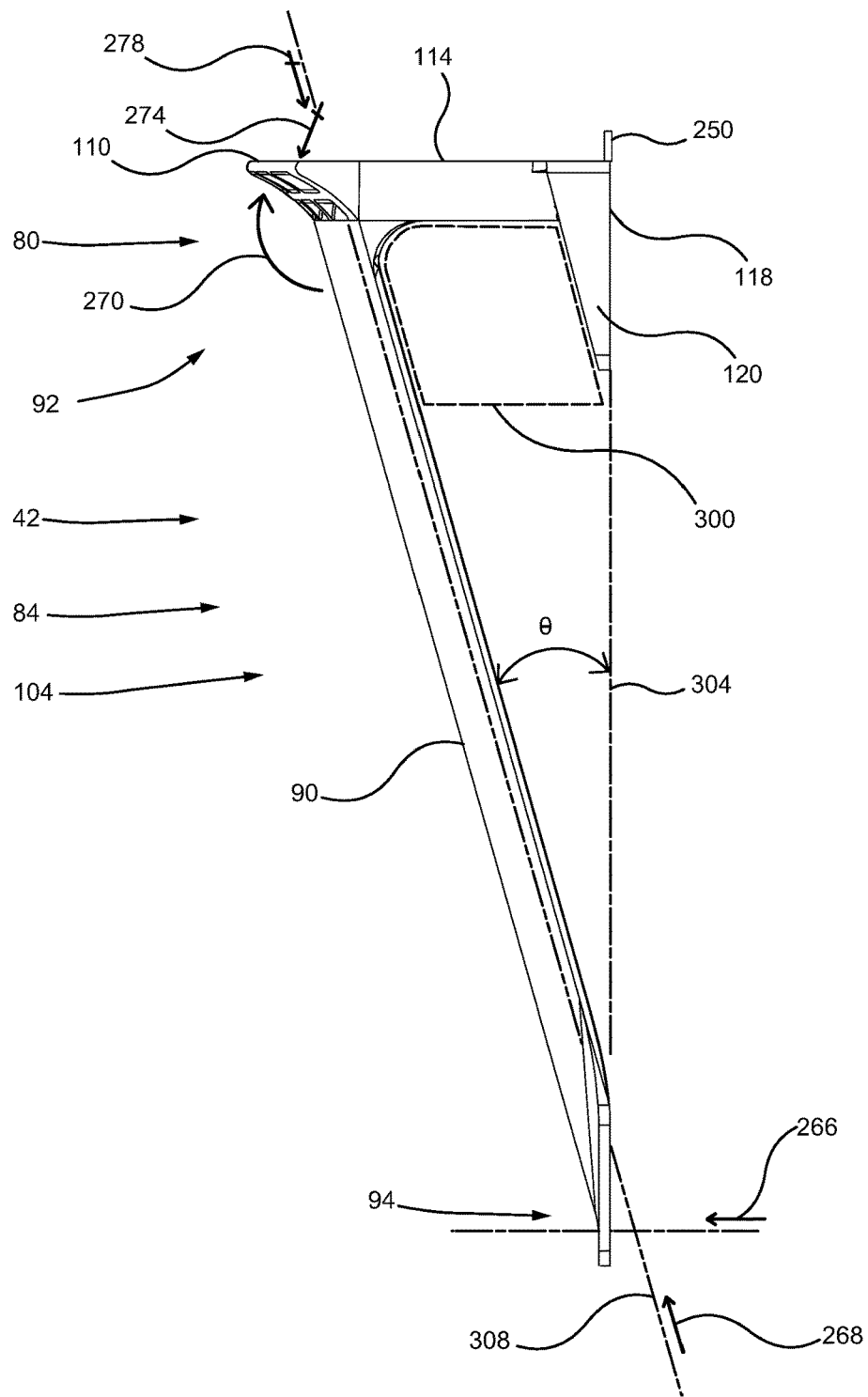
FIG. 29 is a side elevation view of a strut in accordance with at least one embodiment of the invention.
Figure 34:
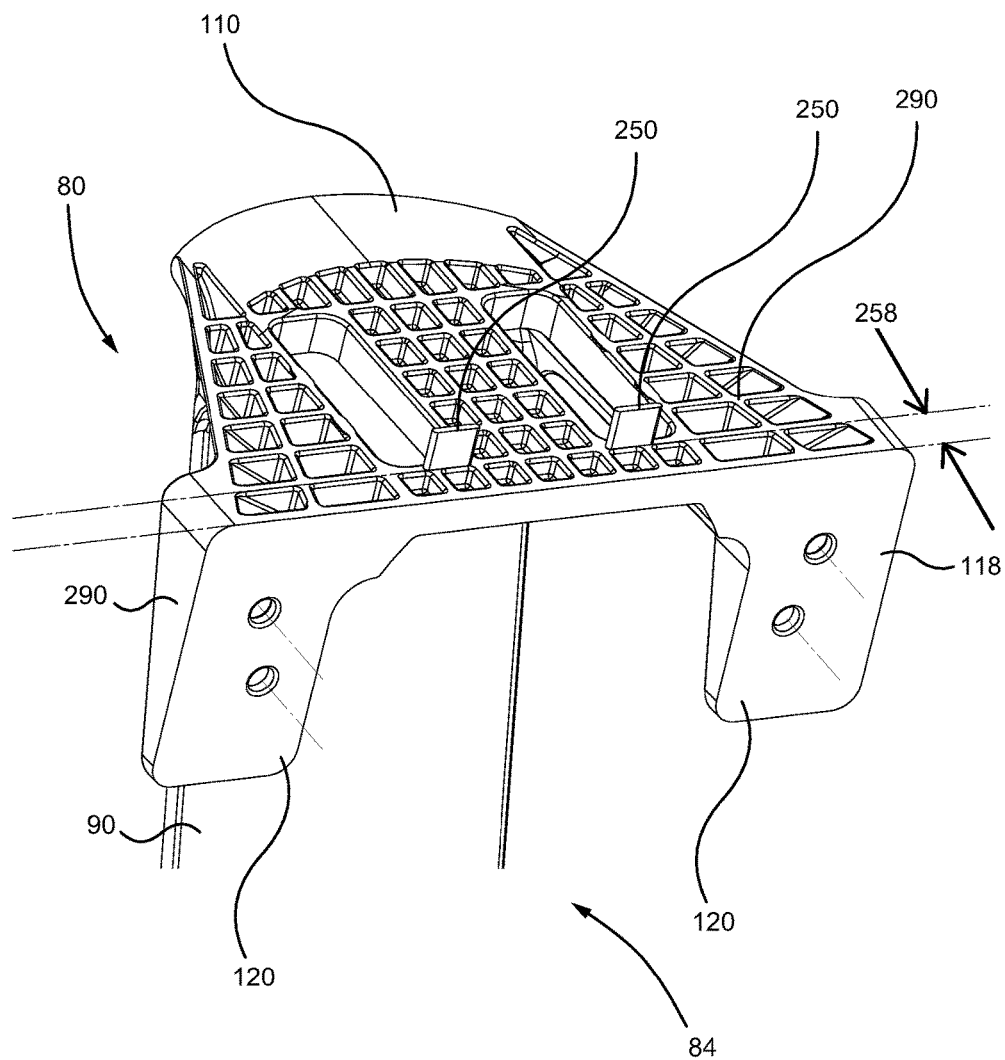
FIG. 34 is a perspective view of a portion of a strut in accordance with at least one embodiment of the invention.
Figure 35:
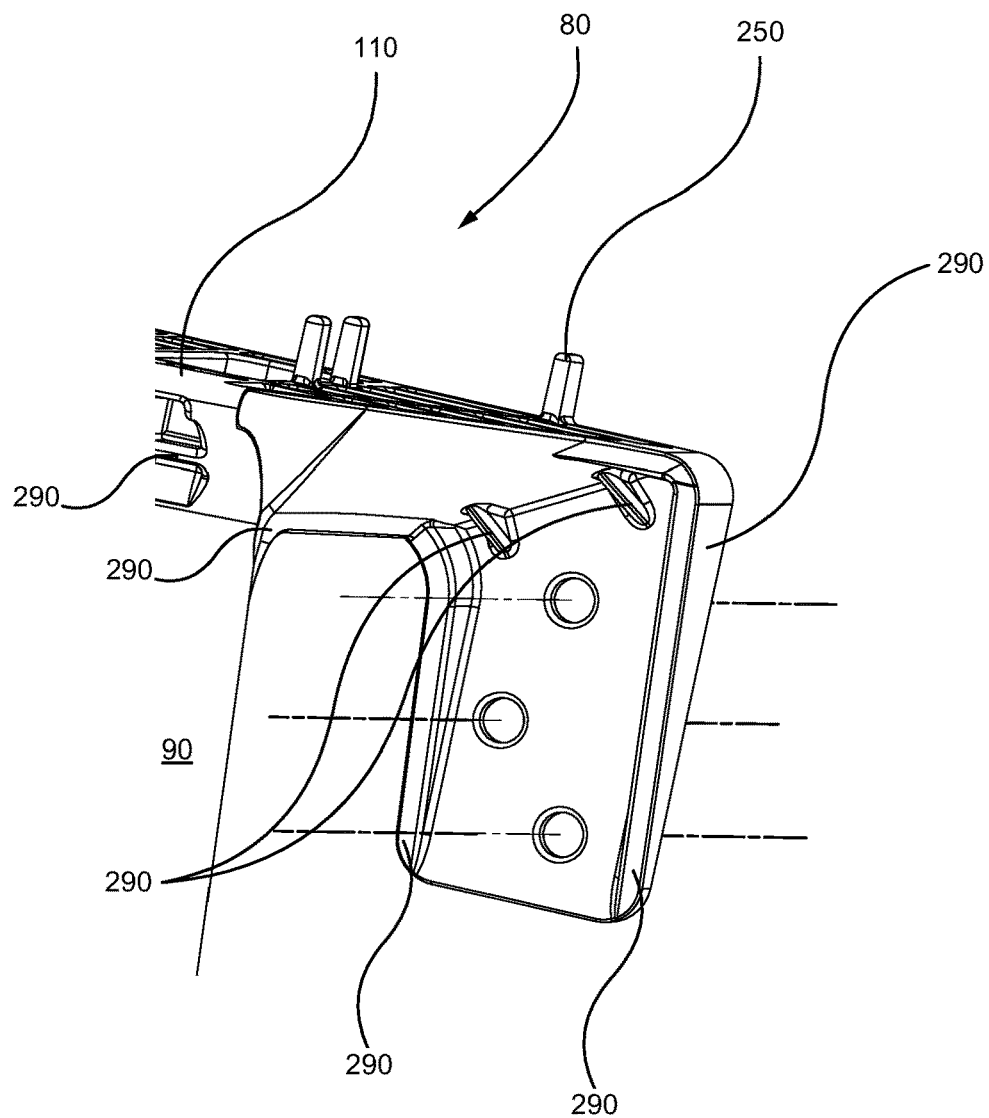
FIG. 35 is a perspective view of a portion of a strut in accordance with at least one embodiment of the invention.

As mentioned above, the strut portion 84 is preferably located on the trailer 20 to have the exterior of the skirt panel 38 vertically aligned, flush with the side wall of the trailer 20. The skirt panel 38 is hence used as a vertical continuity of the trailer's 20 side wall. The alignment of the strut portion 84 might be challenging to achieve. Alignment guides 250 are provided on the trailer-contacting portion 114 to assist the positioning and the installation of the strut portion 84 on the trailer 20. The trailer-contacting portion 114 incorporates alignment guides 250, embodied as protruding members, located at predetermined locations on the trailer-contacting portion 114 from the skirt panel contacting portion 118 used as reference plane for laterally locating the skirt panel 38. The alignment guides 250 can be seen throughout the Figures using some different configurations of distance and shape. The alignment guides 250 can alternatively be embodies as extrusions molded in the strut portion 84, one or many series of holes for receiving added pins, metallic or not, removable stems, clips or the like without departing from the scope of the present description. One way to facilitate the installation of the securing mechanism 42 is to assemble the connection portion 80 to the strut portion 84 prior to assemble the connection portion 80 with the I-beam 142. Then the securing mechanism 42 can be transversally located along the I-beam 142 and the alignment guides 250 are contacting the interior side of the trailer 20 contour frame 254. The predetermined distance 258 between the alignment guides 250 and the skirt-contacting portion 118, in consideration of the thickness of the contour frame 254. The predetermined distance 258 can be calculated as follows: T−t=d (T=thickness of the contour frame 254; t=thickness of skirt panel 38; d=predetermined distance 258 ). In some cases, the thickness of the contour frame 254 equals the thickness of skirt panel 38 and the alignment guides 250 will be aligned with the skirt-contacting portion 118 as illustrated in FIG. 29. In some other cases the thickness of the contour frame 254 is larger than the thickness of skirt panel 38 and the alignment guides 250 will be protrude beyond the skirt-contacting portion 118 as illustrated in FIG. 34. In some additional cases the thickness of the contour frame 254 is smaller than the thickness of skirt panel 38 and the alignment guides 250 will be aligned with the skirt-contacting portion 118. The predetermined distance 258 is generally between about 7 mm and about 12 mm. The alignment guides 250 have, for instance, a height of between about 6 mm to about 25 mm.

Figure 26:
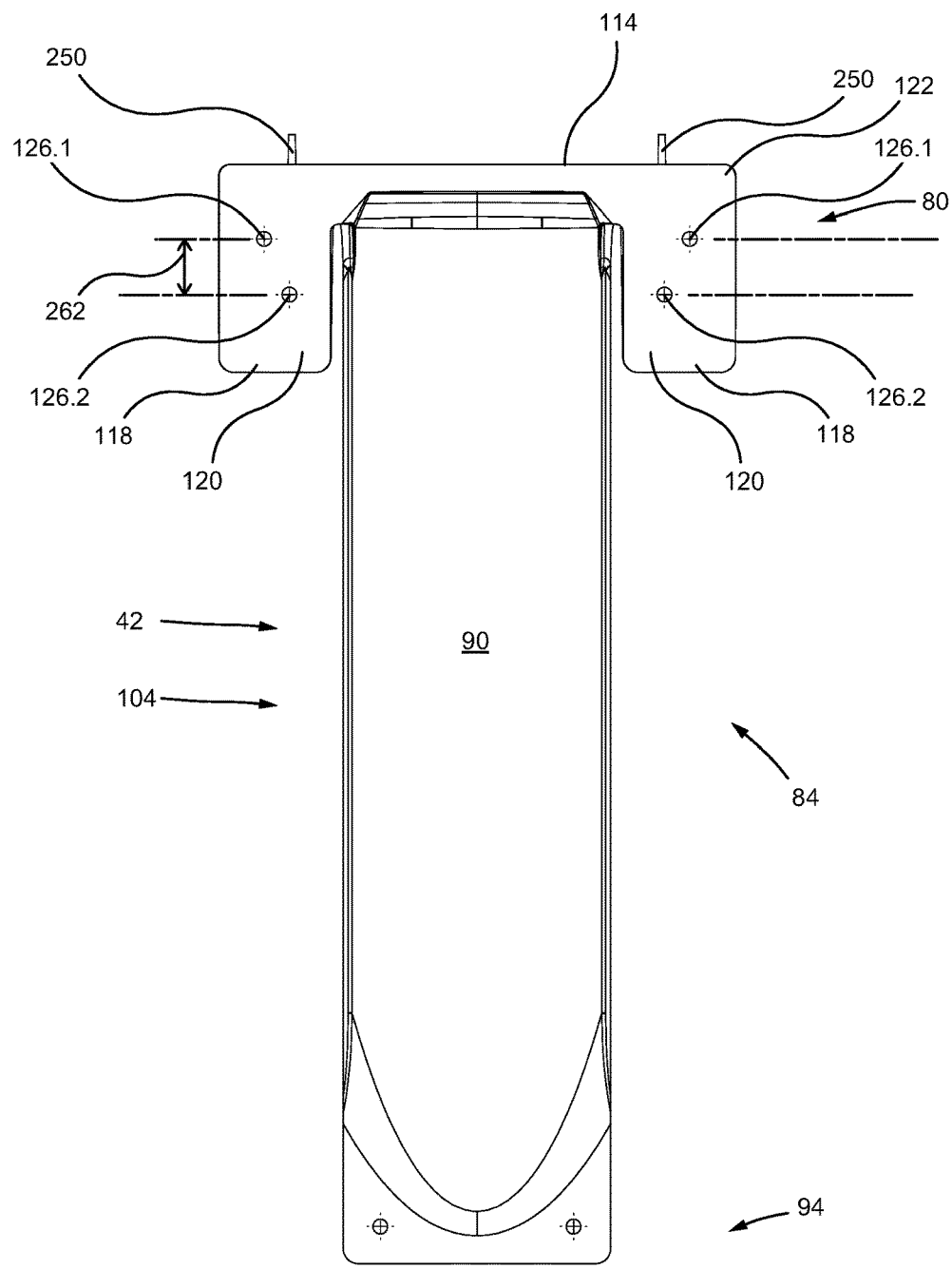
FIG. 26 is a front elevation view of a strut attached to a trailer's floor beam in accordance with at least one embodiment of the invention.
Figure 27:
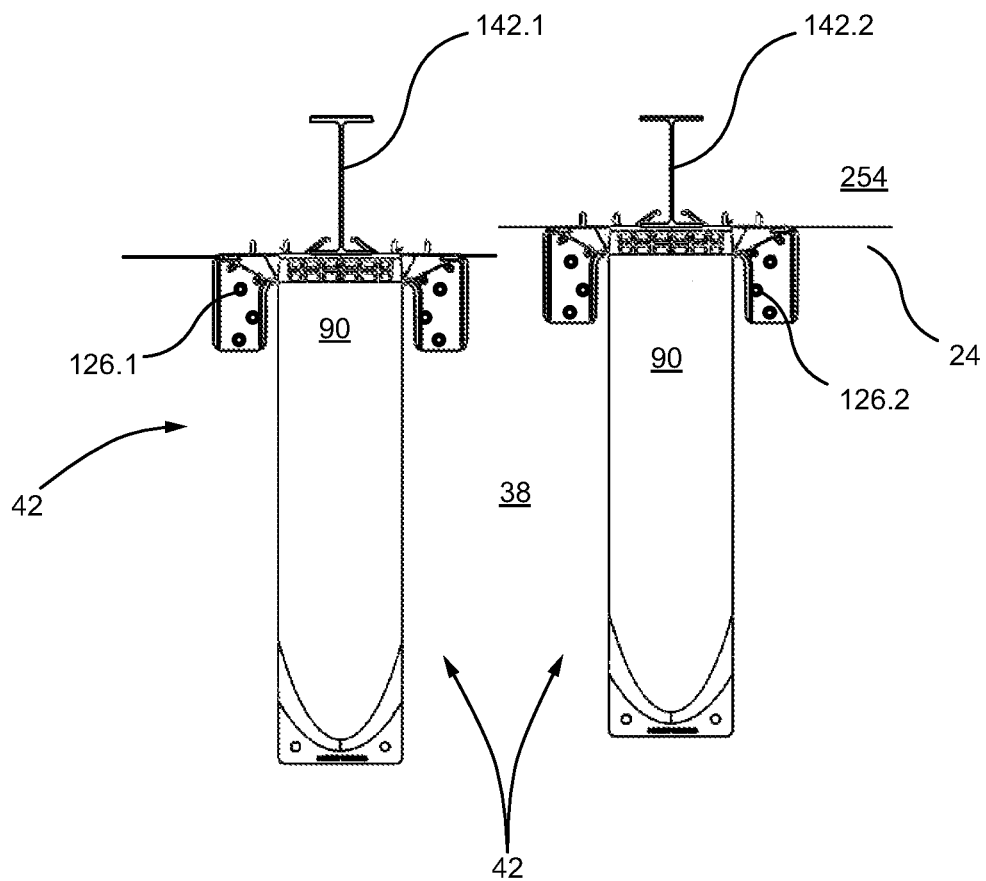
FIG. 27 is a back elevation view of a two struts attached to a trailer's floor beam having two different heights in accordance with at least one embodiment of the invention.
Figure 28:
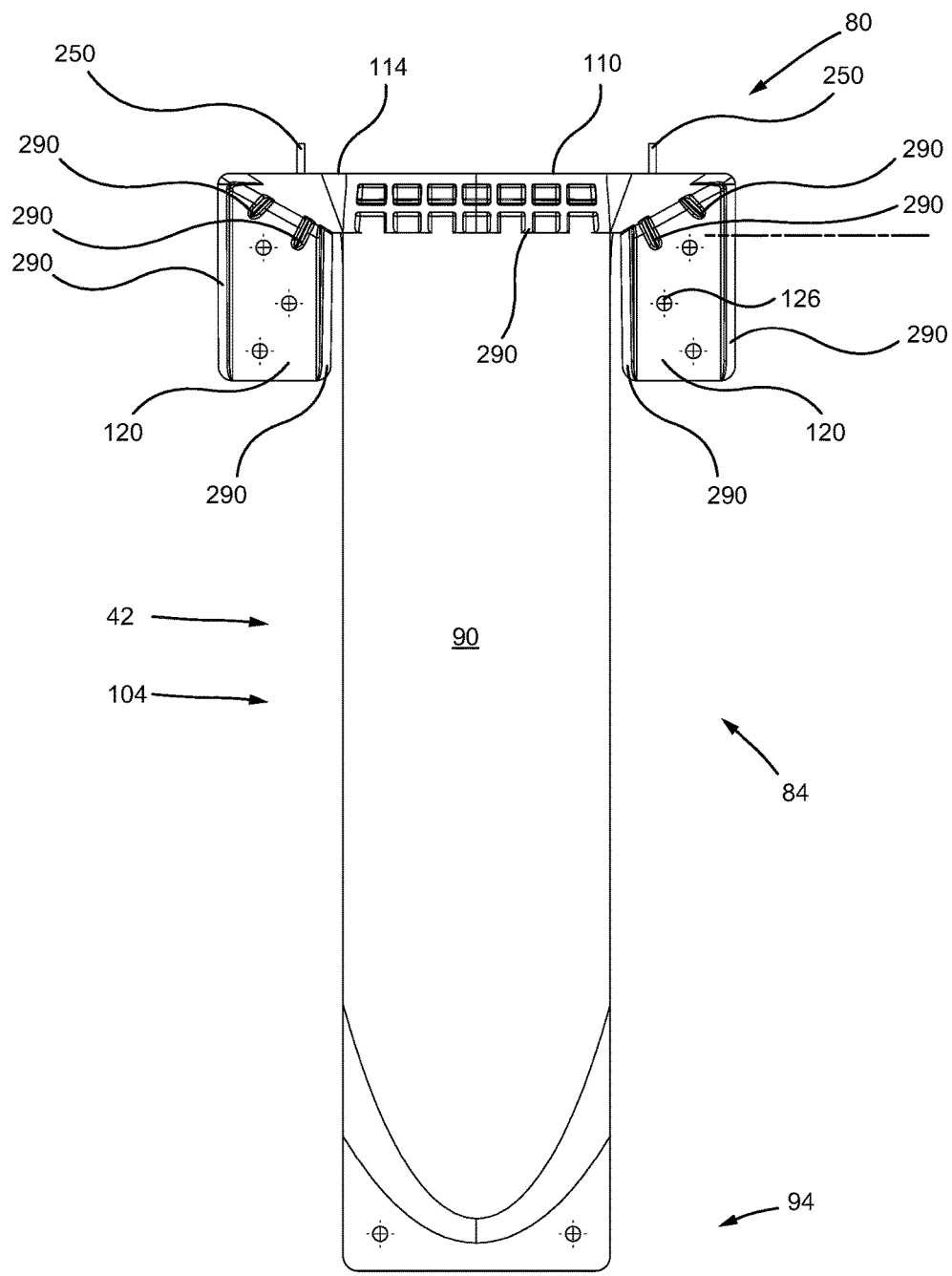
FIG. 28 is a back elevation view of a strut in accordance with at least one embodiment of the invention.

As best seen in FIG. 26, a plurality of sets of holes 126 are provided with a distance 262 variation to accommodate different height of I-beams 142. The I-beam 142 height can be different depending of the trailer 20. Tall I-beams 142.1, as best seen in FIG. 27, can be used to increase the strength of the trailer 20 to maximize the cargo load. For example, the portion of the trailer 20 accommodating the slider rail 24 can require shorter I-beam 142.2 to clear the contour frame 254 of the trailer 20. The higher set of holes 126.1 is going to be used in cooperation with a high I-beam 142.1 while the lower set of holes 126.2 is going to be used in cooperation with a low I-beam 142.2 as depicted in FIG. 26.

Figure 30:
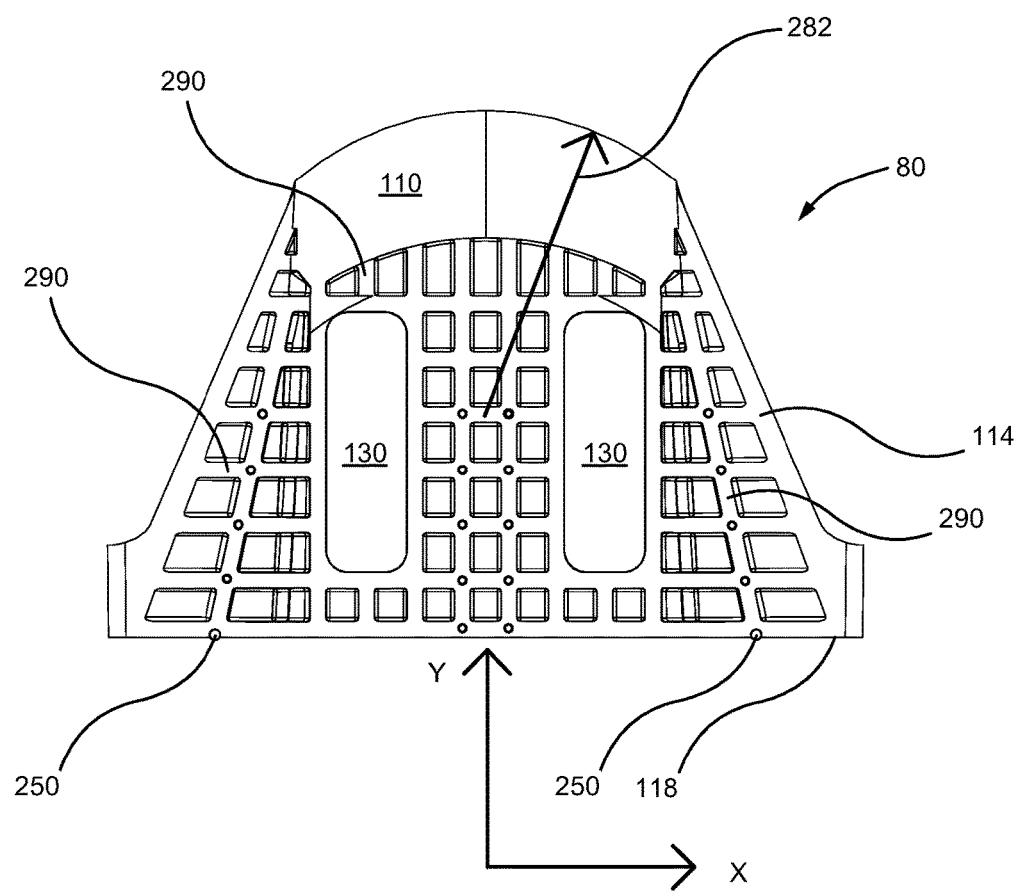
FIG. 30 is a top plan view of a strut in accordance with at least one embodiment of the invention.
Figure 31:
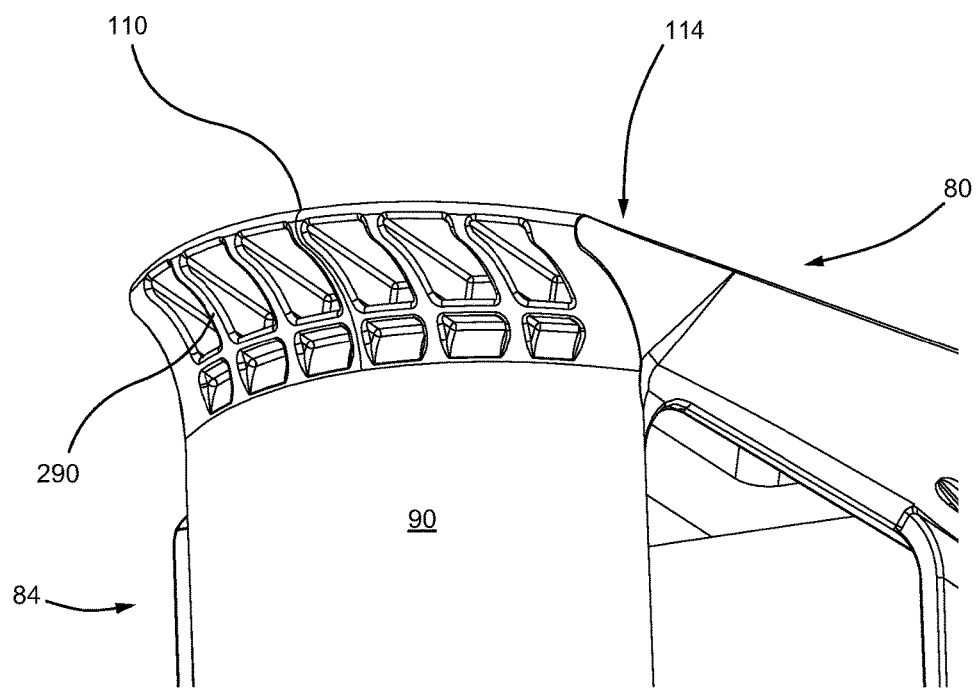
FIG. 31 is a perspective view of a portion of a strut in accordance with at least one embodiment of the invention.
Figure 32:
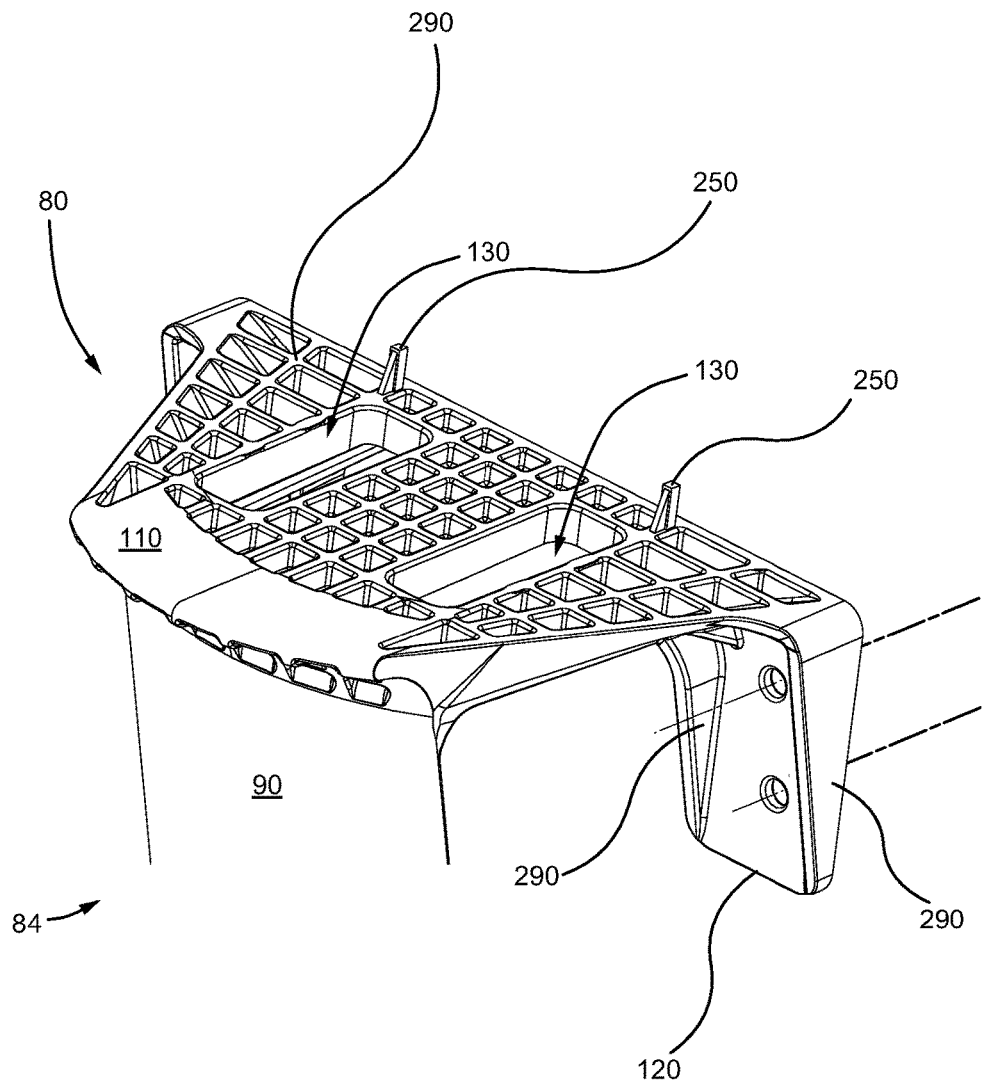
FIG. 32 is a perspective view of a portion of a strut in accordance with at least one embodiment of the invention.
Figure 33:
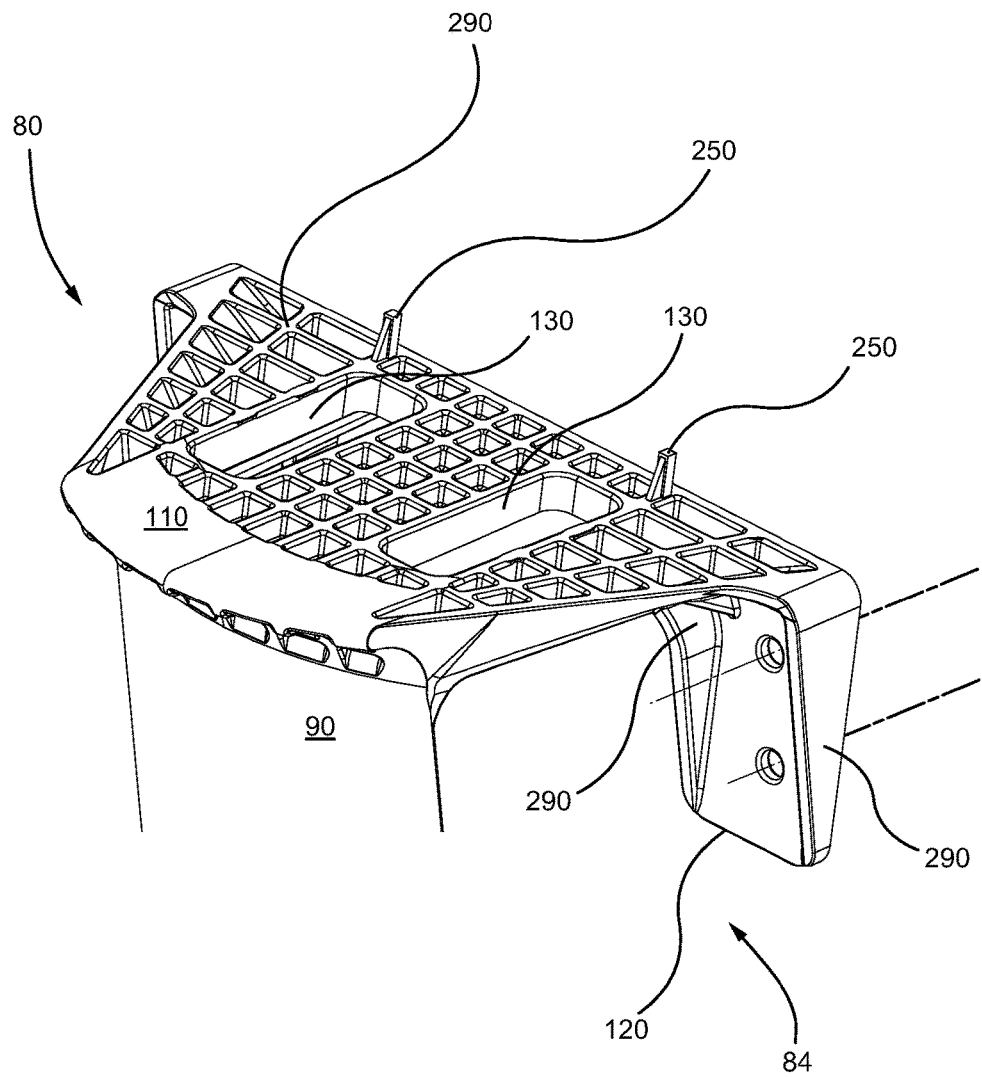
FIG. 33 is a perspective view of a portion of a strut in accordance with at least one embodiment of the invention.

The stabilizer 110 that can be seen in many Figures is an extension of the trailer-contacting portion 114 to extend the contact surface with the I-beam 142 to improve the strength of the upper portion 92 of the strut portion 84. As best seen in FIG. 29, the transversal force 266, and-or the axial force 268, applied to the skirt panel 38 is transmitted to as a moment 270, a normal reaction 274 and/or an axial reaction 278 to the upper portion 92 of the strut portion 84. The stabilizer 110 function as a transfer lever element of the loads acting on the strut member 90 into the I-beam 142 on which the strut portion 84 is installed. In addition, the stress transferred towards the openings 130 locations due to deformation and flexing of the strut portion 84 is reduced by the stabilizer 110. The radius 282 of sweep of the stabilizer 110, illustrated in FIG. 30 and FIG. 31, is following a generally constant radius as the radius of the strut member 90 to optimize its compatibility with the strut member 90. The geometry of the strut member 90 is going to be discussed in further details below. Still referring to FIG. 30, the trailer-contacting portion 114 includes a plurality of reinforcement ribs 290 oriented in different directions, generally orthogonal to each other, to help minimize deformation of the strut portion 84. The deformation in the Y direction is generally due to moment created by the weight of the skirt panel 38 and the stress applied to the strut portion 84 when contacting a foreign object. Ribs 290 in the X direction strengthen the skirt-contacting portion 118 from sagging due to the weight of the skirt panel 38 and the stress applied to the strut portion 84 when contacting a foreign object. The ribs 290 are preferably extending only from one surface, the upper surface or the lower surface, to facilitate the manufacturing process of the part. However, the surface of the stabilizer 110 that is in contact with the I-beam 142 has no ribs 290 to optimize its capacity to sustain significant pressure by spreading it over a larger contact surface and to avoid ribs 290 plastic deformation.

It can be appreciated from FIG. 17 and FIG. 29 that the strut portion 84 is sized and designed to allow connector portion 80 access through an access portion 300 to access the fasteners 138 during installation of the securing mechanism 42. One can appreciate from FIG. 29 the angle θ between the plane 304 where the skirt panel 38 is going to be secured to the strut portion 84 and the axis 308 of the strut member 90. The angle θ is between about 10 degree and about 30 degree. The angle θ is preferably between about 12 degree and about 18 degree. Most preferably, the angle θ is between about 15 degree and about 16 degree depending on the type of use and the type of trailer 20.

Figure 36:
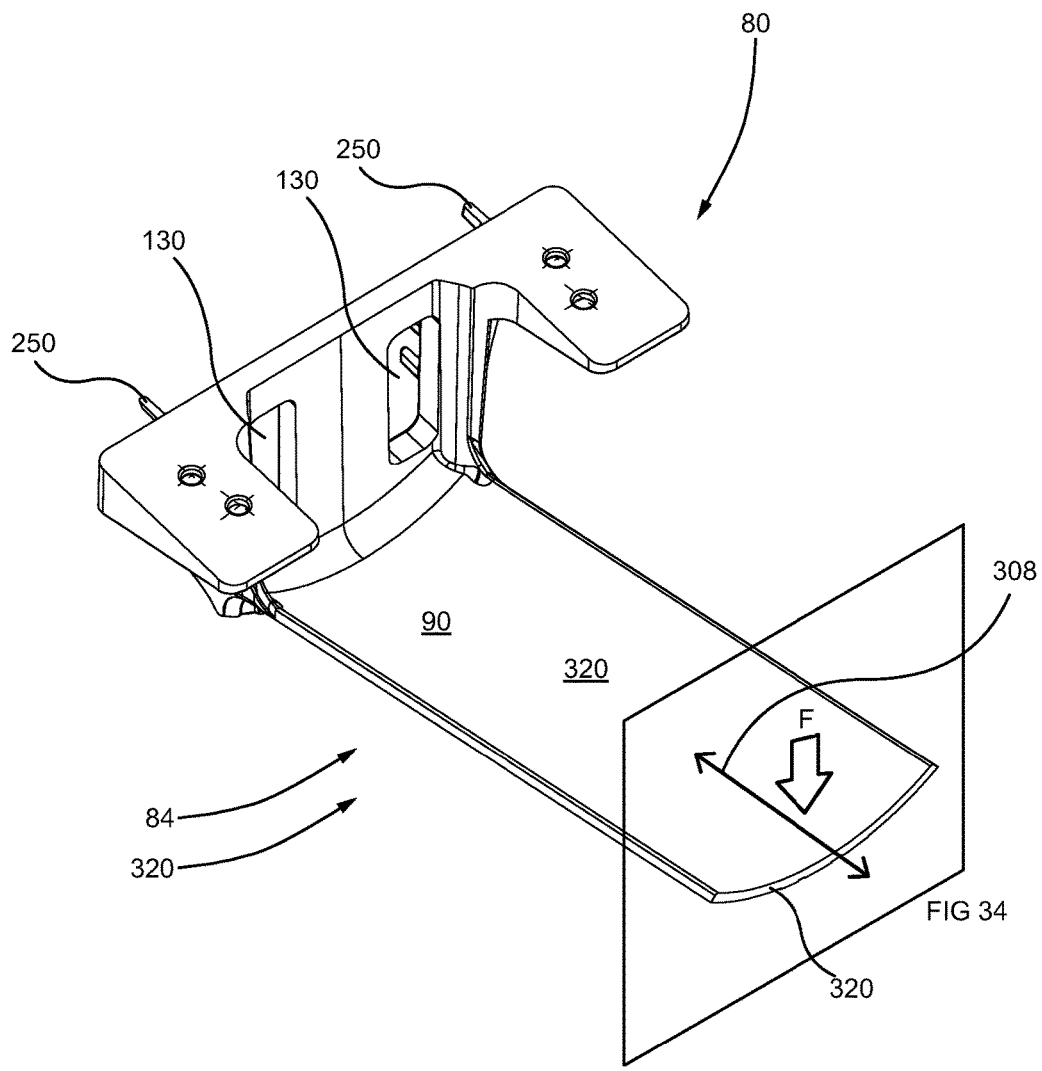
FIG. 36 is a perspective view of a portion of a strut in accordance with at least one embodiment of the invention.
Figure 37:
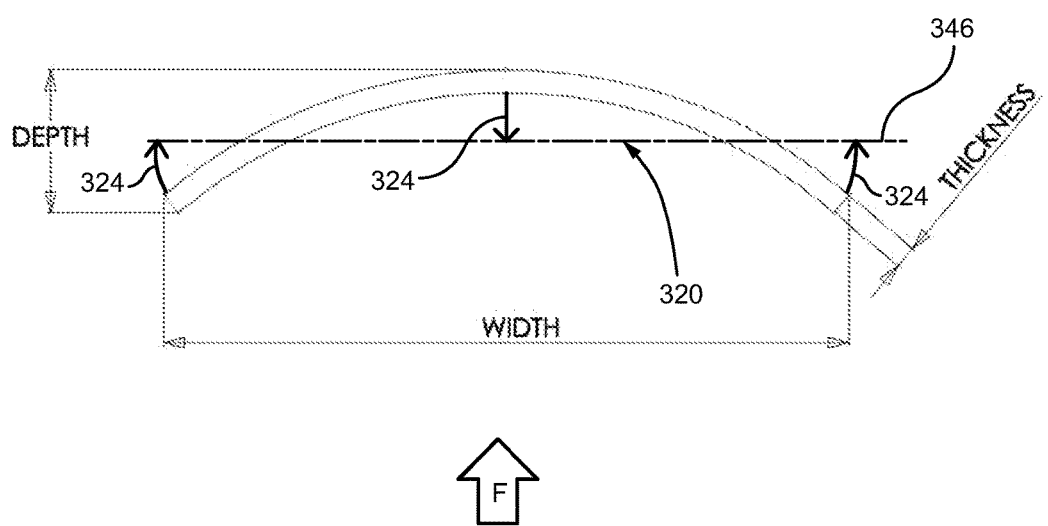
FIG. 37 is a top plan section view of a portion of a strut in accordance with at least one embodiment of the invention.
Figure 38:
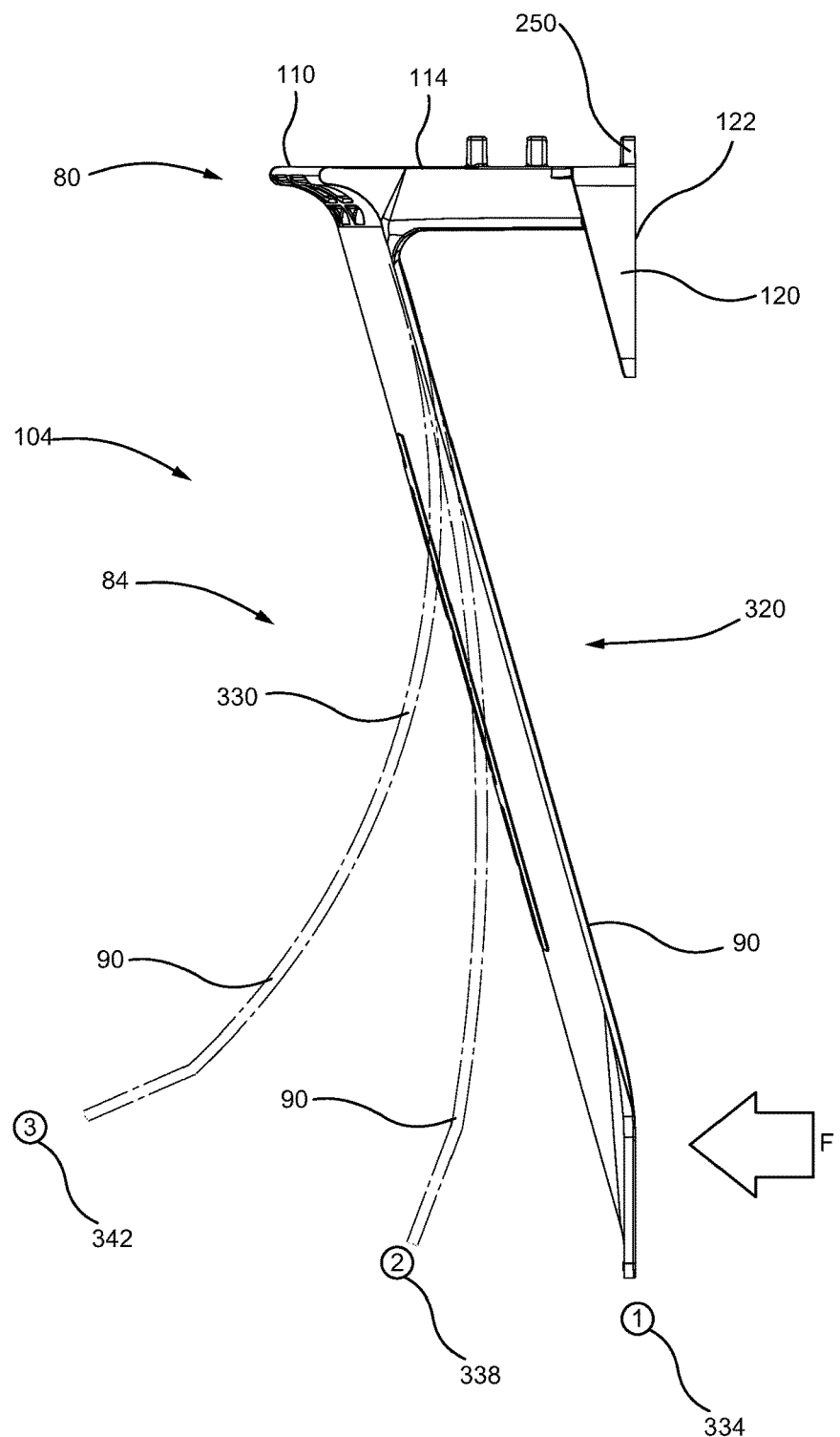
FIG. 38 is a side elevation view of a strut in accordance with at least one embodiment of the invention.
Figure 39:
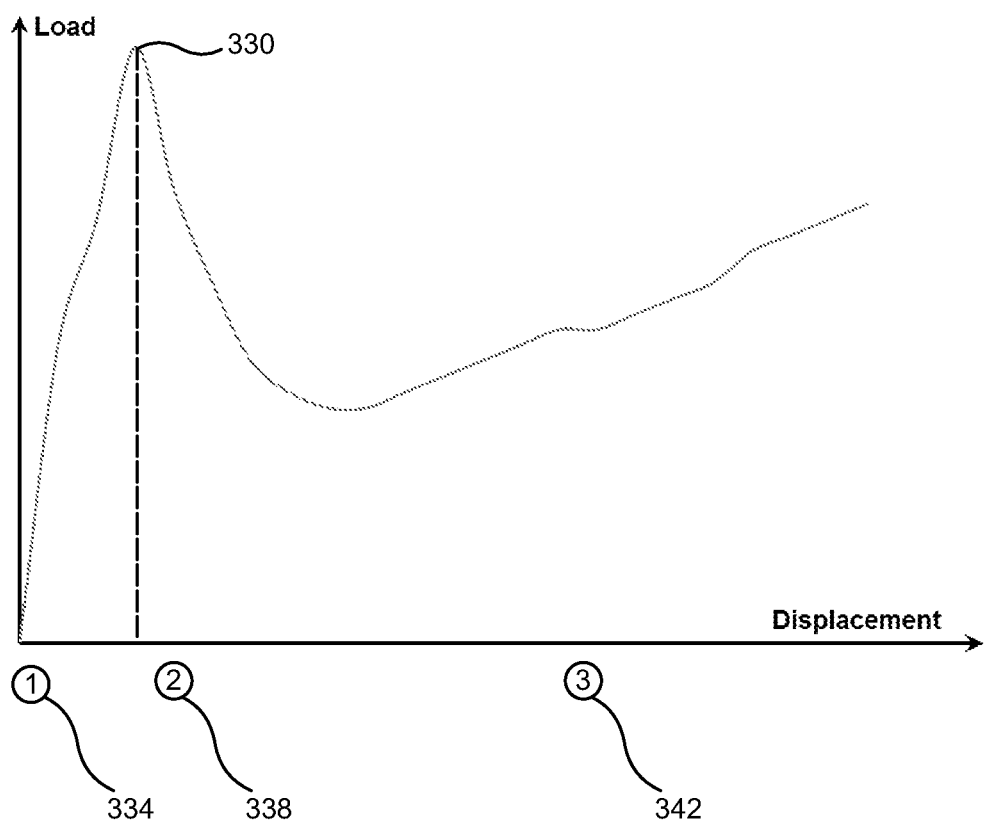
FIG. 39 is a graph illustrating a load vs displacement of a strut in accordance with at least one embodiment of the invention.

A skilled reader would have noticed the shape of the strut member 90 that includes a concave portion 320 (when seen from a side of the trailer 20 toward the trailer 20 ). The concave portion 320 of the strut portion 90 offers some advantages in the manner the strength of the strut portion 90 is applied to the skirt assembly 30 when an external force, that might be caused by contacting an external object, is applied to the strut portion 84. In light of FIG. 36 throughout FIG. 39, it can be noted that the side of the cavity of the concave portion 320 has an impact on the amount of force required to buckle and bend the strut member 90. It can be appreciated the cavity of the concave portion 320 toward the skirt panel 38 provides more strength when a force is applied toward the trailer 20. In case another behavior requiring a smaller force to bend the strut member 90 is desirable, the concave portion 320 could alternatively be inverted toward the center of the trailer without departing from the scope of the present description. In the present situation where the cavity of the concave portion 320 is located toward the skirt panel 38, a stronger force directed toward the trailer is required to bend the member 90 than if the cavity of the concave portion 320 is in the opposite direction toward the center of the trailer 20. The concave portion 320 is going to change progressively as illustrated in FIG. 37 and the section of the concave portion 320 tends to straighten 346, as illustrated by arrows 324. The resistance of the strut member 90 will be strong until the strut member 90 buckles 330 and flexes more easily after it has buckled as illustrated in FIG. 39. This offers significant advantages by maintaining strongly the skirt panel 38 in an aerodynamically operating configuration 334 that could flex and provide some deflection 338 until a predetermined load is applied that overcome the buckling load threshold 330 of the strut member 90 design. In other words, the strut member 90 is going to be strong and maintain an efficient operating configuration despite the loads applied thereon when the loads are smaller than the buckling load threshold 330 and will become less resistant when buckling and more prone to flex and deflect significantly 342 when the load applied thereon is beyond the buckling load threshold 330. Such a significant load is generally caused by an undesirable event, like a contact with an exterior object, to overcome the object without damaging the aerodynamic skirt assembly 30. The operating configuration 334 position of the strut member 90 is automatically recovered when the load is significantly reduced, or removed. Table A below is in reference with FIG. 37.

TABLE A

| Strut member's | Minimum | Maximum |
| --- | --- | --- |
| Depth A | 5 mm | 25 mm |
| Depth B | 6 mm | 20 mm |
| Depth C | 7 mm | 15 mm |
| Depth D | 8 mm | 12 mm |
| Width A | 50 mm | 180 mm |
| Width B | 60 mm | 160 mm |
| Width C | 70 mm | 140 mm |
| Width D | 80 mm | 120 mm |

TABLE A-continued

| Strut member's | Minimum | Maximum |
| --- | --- | --- |
| Thickness A | 2 mm | 10 mm |
| Thickness B | 3 mm | 8 mm |
| Thickness C | 4 mm | 7 mm |
| Thickness D | 4.5 mm | 6 mm |

To achieve that, the strut portion 84 can be built from a variety of polymers that are flexible and resilient enough to perform the required flex. Materials such as, but not limited to, polypropylene, nylon, nylon co-polymer, thermoplastic poly olefin, polyethylene, polycarbonate and thermosets, charged with fibers or not, could be used. Alternatively, other material such as metal that are designed to remain in their elastic domain can also be suitable to bend, buckle and automatically recover its original shape. Manufacturing processes including, but not limited to, injection molding, machining, thermoforming and RTM could be used in consideration of the selected material and other constraints.

Figure 40:
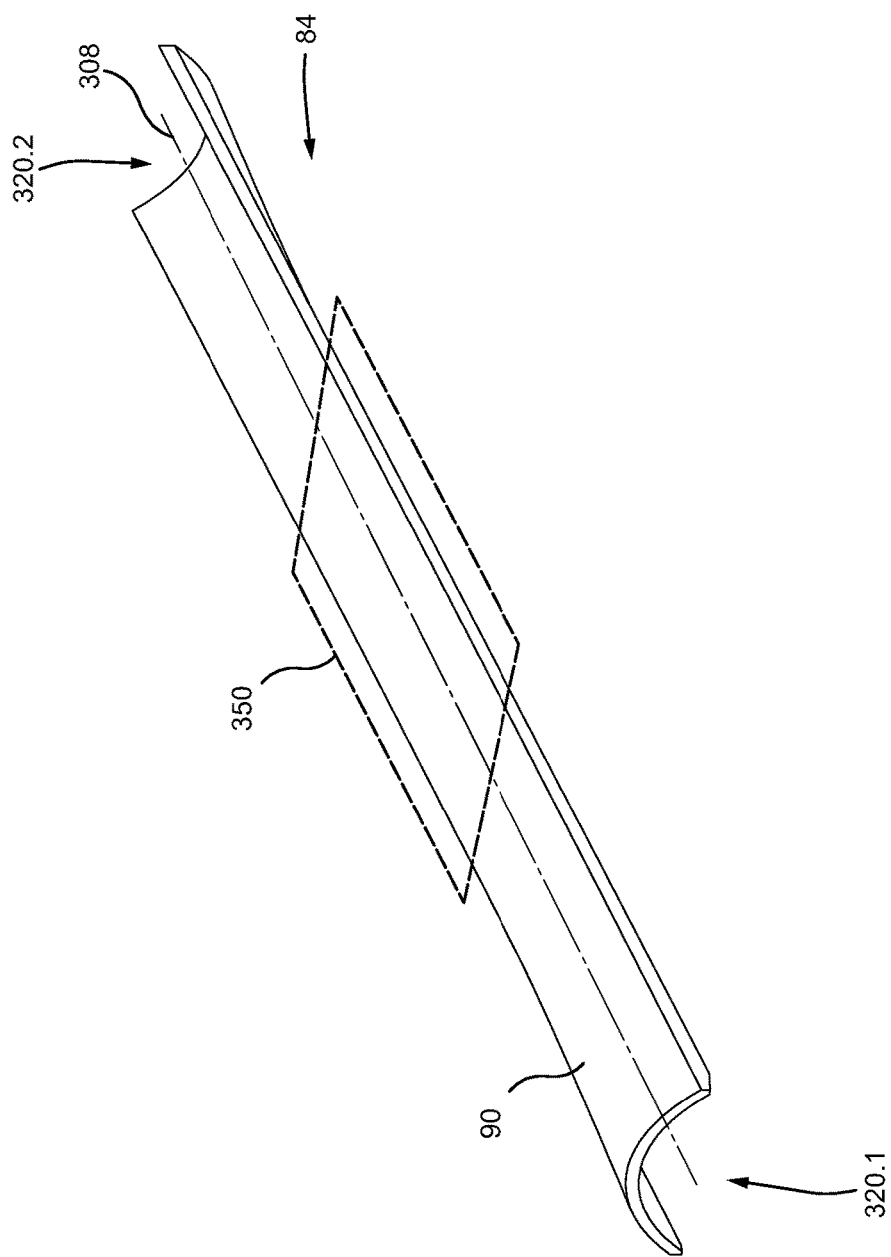
FIG. 40 is a perspective view of a strut in accordance with at least one embodiment of the invention.
Figure 41:
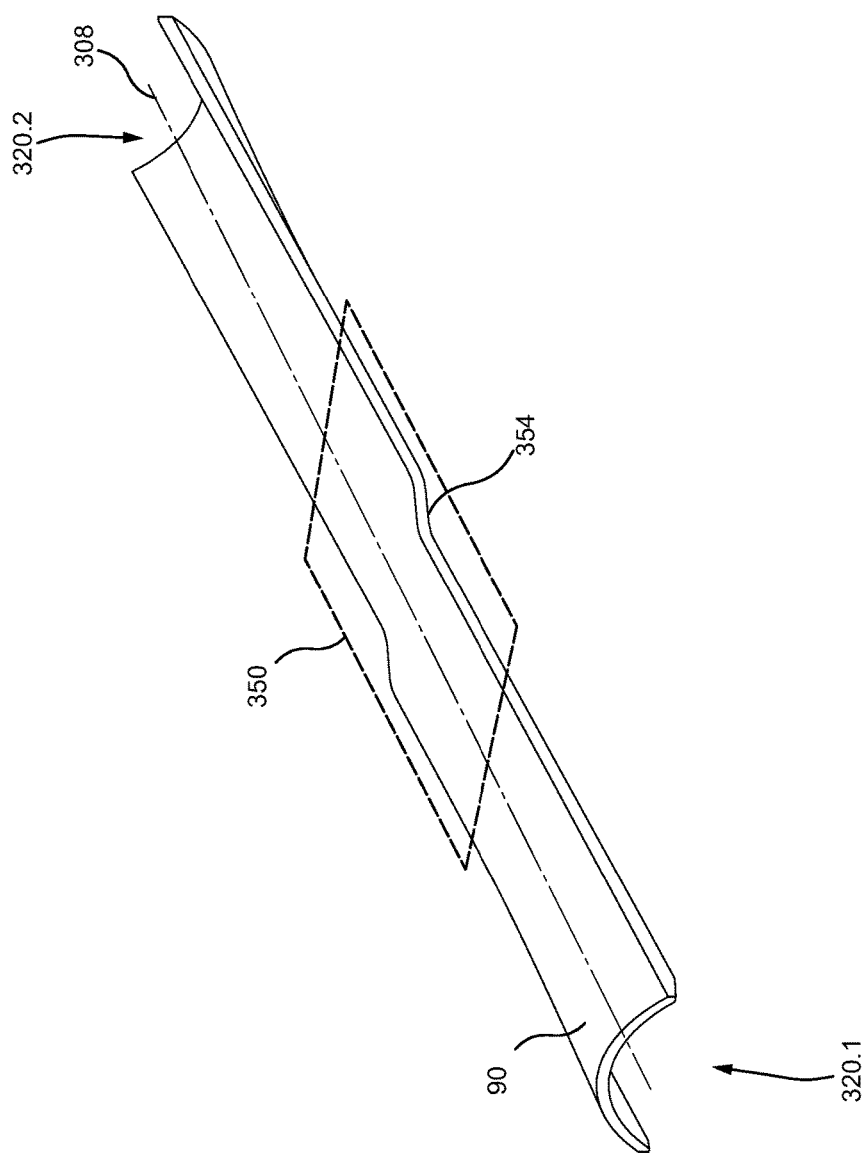
FIG. 41 is a perspective view of a strut in accordance with at least one embodiment of the invention.

An additional embodiment is illustrated in FIG. 40 and FIG. 41. In this embodiment, the strut member 90 includes two concave portions 320.1, 320.2 directed toward opposite directions. A transition portion 350 where the two concave portions 320.1, 320.2 are merging is illustratively located around the middle portion of the strut member 90. The transition portion 350 delimits a portion of the strut member 90 where the flex behavior of the strut member 90 is not within the desired load-supporting range of either of the two concave portions 320.1, 320.2. For instance, the transition portion 350 includes the portion of the strut member 90 that is not concave and offers much less resistance to buckling and bending. The size of the transition portion 350 can vary depending of the particular design of the strut member 90. An advantage of the embodiment illustrated in FIG. 40 and FIG. 41 would be to provide a comparable resistance when the skirt panel 38 sustains a force in the direction of the trailer 20 and a force in the direction opposed to the trailer 20, taking advantages of the location and the direction of the cavities 320.1, 320.2 to allow resiliency behaviors in both directions. FIG. 40 illustrates a rather flat transition portion 350 while FIG. 41 illustrates an alternate design including a transition portion with an offset portion 354 to ensure one edge of each of the two concave portions 320.1, 320.2 are co-linear to help standardizing the behavior of both sides of the strut member 90.

The transition portion 350 can alternatively include reinforcing ribs to prevent bending. Ribs (not illustrated) can be added on each edges of the strut member 90 over the length of the transition portion 350. Additional ribs can be localized over the surface of the transition portion 350. Alternatively, a pair of clamp members (not illustrated) can be added to sandwich the transition portion 350 and secured together with fasteners, for example. The pair of clamp members prevents bending in the region of the strut member 90 that is covered by the pair of clamp members. The design, shape, length and location of the pair of clamp members can be used to modify, adjust and optimize the behavior of the strut portion 84.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. A skirt securing connector securing an aerodynamic skirt panel to a trailer, the skirt securing connector comprising:
    an upper portion adapted to fixedly secure the skirt securing connector to the trailer and adapted to secure an upper portion of the aerodynamic skirt panel;
    a lower portion adapted to secure a lower portion of the aerodynamic skirt panel; and
    a strut member connected, at a first end thereof, to the upper portion of the skirt securing connector and connected, at a second end thereof, to the lower portion of the skirt securing connector, the strut member including a longitudinal axis between the first end and the second end, the strut member including a concave portion extending along the longitudinal axis, the concave portion increasing the rigidity of the strut member to sustain a force applied by air routing on the aerodynamic skirt in an aerodynamic configuration and allowing the strut member to deform to buckle and bend when a force exceeding a buckling threshold is applied on the aerodynamic skirt to momentarily move the aerodynamic skirt from the aerodynamic configuration to an object avoidance configuration and returning back by itself to the aerodynamic configuration when the force exceeding the buckling threshold is not applied on the aerodynamic skirt.

2. The skirt securing device of claim 1, wherein the concave portion includes a cavity substantially facing the aerodynamic skirt.

3. The skirt securing device of claim 1, wherein the strut member is made of polymer.

4. The skirt securing device of claim 1, wherein a section of the concave portion becomes flat where buckling.

5. The skirt securing device of claim 1, wherein the concave portion has a depth of between about 5 mm and 25 mm.

6. The skirt securing device of claim 1, wherein the concave portion has a width of about between 50 mm and 180 mm.

7. The skirt securing device of claim 1, wherein the skirt securing device comprises a trailer-contacting portion for securing the skirt securing device to the trailer.

8. The skirt securing device of claim 7, wherein the upper portion comprises a skirt panel contacting portion, the skirt panel contacting portion being about a 90-degree angle with respect to the trailer-contacting portion.

9. The skirt securing device of claim 7, wherein the trailer-contacting portion includes a pair of openings for receiving a pair of clamps securing the trailer-contacting portion to the trailer.

10. The skirt securing device of claim 7, wherein the trailer-contacting portion includes a mechanism to locate the trailer-contacting portion with respect to a side of the trailer.

11. An aerodynamic skirt assembly comprising:
    an aerodynamic skirt panel;
    a plurality of skirt securing connectors, each skirt securing connector comprising an upper portion adapted to fixedly secure the skirt securing connector to the trailer and adapted to secure an upper portion of the aerodynamic skirt panel;

a lower portion adapted to secure a lower portion of the aerodynamic skirt panel; and a strut member connected, at a first end thereof, to the upper portion of the skirt securing connector and connected, at a second end thereof, to the lower portion of the skirt securing connector, the strut member including a longitudinal axis between the first end and the second end, the strut member including a concave portion extending along the longitudinal axis, the concave portion increasing the rigidity of the strut member to sustain a force applied by air routing on the aerodynamic skirt in an aerodynamic configuration and allowing the strut member to deform to buckle and bend when a force exceeding a buckling threshold is applied on the aerodynamic skirt to momentarily move the aerodynamic skirt from the aerodynamic configuration to an object avoidance configuration and returning back by itself to the aerodynamic configuration when the force exceeding the buckling threshold is not applied on the aerodynamic skirt.

12. The aerodynamic skirt assembly of claim 11, wherein the concave portion includes a cavity substantially facing the aerodynamic skirt.

13. The aerodynamic skirt assembly of claim 11, wherein the strut member is made of polymer.

14. The aerodynamic skirt assembly of claim 11, wherein a section of the concave portion becomes flat where buckling.

15. The aerodynamic skirt assembly of claim 11, wherein the concave portion has a depth of between about 5 mm and 25 mm.

16. The aerodynamic skirt assembly of claim 11, wherein the concave portion has a width of about between 50 mm and 180 mm.

17. The aerodynamic skirt assembly of claim 11, wherein the skirt securing device comprises a trailer-contacting portion for securing the skirt securing device to the trailer.

18. The aerodynamic skirt assembly of claim 17, wherein the upper portion comprises a skirt panel contacting portion, the skirt panel contacting portion being about a 90-degree angle with respect to the trailer-contacting portion.

19. The aerodynamic skirt assembly of claim 17, wherein the trailer-contacting portion includes a pair of openings for receiving a pair of clamps securing the trailer-contacting portion to the trailer.

20. The aerodynamic skirt assembly of claim 17, wherein the trailer-contacting portion includes a mechanism to locate the trailer-contacting portion with respect to a side of the trailer.

* * * * *